US009523590B2

(12) United States Patent
Yamanobe

(10) Patent No.: US 9,523,590 B2
(45) Date of Patent: Dec. 20, 2016

(54) ENCODER AND DRIVE DEVICE

(71) Applicant: NIKON CORPORATION, Tokyo (JP)

(72) Inventor: Kiichiro Yamanobe, Sendai (JP)

(73) Assignee: NIKON CORPORATION, Tokyo (JP)

( * ) Notice: Subject to any disclaimer, the term of this patent is extended or adjusted under 35 U.S.C. 154(b) by 255 days.

(21) Appl. No.: 14/404,548

(22) PCT Filed: May 29, 2013

(86) PCT No.: PCT/JP2013/064879
§ 371 (c)(1),
(2) Date: Nov. 28, 2014

(87) PCT Pub. No.: WO2013/180165
PCT Pub. Date: Dec. 5, 2013

(65) Prior Publication Data
US 2015/0260551 A1 Sep. 17, 2015

(30) Foreign Application Priority Data

May 30, 2012 (JP) ................................ 2012-123121

(51) Int. Cl.
G01D 5/244 (2006.01)
G01D 5/245 (2006.01)

(52) U.S. Cl.
CPC ........ *G01D 5/24476* (2013.01); *G01D 5/2454* (2013.01); *G01D 5/24495* (2013.01)

(58) Field of Classification Search
CPC ...... G01B 7/003; B60L 13/06; G01D 5/24476
See application file for complete search history.

(56) References Cited

U.S. PATENT DOCUMENTS 5,818,741 A 10/1998 Boie et al.
6,772,101 B1 8/2004 Tanaka et al.
(Continued)

FOREIGN PATENT DOCUMENTS

| JP | H08-335853 A | 12/1996 |
| JP | 2001-074501 A | 3/2001 |
| JP | 2002-081963 A | 3/2002 |

OTHER PUBLICATIONS

Jul. 9, 2013 International Search Report issued in International Patent Application No. PCT/JP2013/064879.
(Continued)

*Primary Examiner* — Vinh Nguyen
*Assistant Examiner* — Alvaro Fortich
(74) *Attorney, Agent, or Firm* — Oliff PLC

(57) ABSTRACT

An encoder includes a positional information generation unit configured to generate first positional information based on a detected signal which is output by a sensor unit, and an IIR filter unit configured to output second positional information obtained by performing filtering on the first positional information. In the IIR filter unit, a counter unit stores a predetermined high-order digit of the first positional information as a count value, and an input unit subtracts the count value from the first positional information to thereby generate input information. A computation unit generates an internal computation result based on delay information which is an internal computation result stored in a delay information storage unit, input information, and a predetermined filter coefficient, and generates output information on which filtering is performed. An output unit adds the count value and the output information to thereby generate second positional information. A changing unit changes a value of the delay information based on a unit of change of the input information when the value of the delay information falls outside of a predetermined range, and changes the count value.

12 Claims, 12 Drawing Sheets

(56) References Cited

U.S. PATENT DOCUMENTS

| | | | |
|---|---|---|---|
| 2002/0030497 A1 | 3/2002 | Uehira et al. | |
| 2005/0031322 A1* | 2/2005 | Boyle | H02P 6/17 388/800 |
| 2011/0122313 A1* | 5/2011 | Lu | H04N 7/035 348/464 |
| 2012/0033827 A1* | 2/2012 | Murata | G10K 11/1782 381/94.1 |

OTHER PUBLICATIONS

Jul. 9, 2013 Written Opinion issued in International Patent Application No. PCT/JP2013/064879.

* cited by examiner

ENCODER AND DRIVE DEVICE

TECHNICAL FIELD

The present invention relates to an encoder and a drive device.

Priority is claimed on Japanese Patent Application No. 2012-123121, filed May 30, 2012, the content of which is incorporated herein by reference.

BACKGROUND

There is known an encoder that includes a filter unit such as a low pass filter performing filtering on a detected signal (for example, an incremental signal), which is detected by a sensor unit, in order to reduce influence due to disturbance (noise) (for example, see Patent Document 1). The encoder detects positional information of a driven body based on the detected signal having been subjected to filtering by the filter unit.

RELATED ART DOCUMENTS

Patent Documents

[Patent Document 1] Japanese Unexamined Patent Application, First Publication No. 2002-81963

SUMMARY OF INVENTION

Problems to be Solved by the Invention

However, for example, in the above-mentioned encoder, when filtering is performed on the incremental signal by the low pass filter, it is difficult to reduce influence due to disturbance (noise) which is equal to or less than the maximum frequency of the incremental signal. That is, in the above-mentioned encoder, characteristics of the filter are restricted due to, for example, a frequency of the detected signal. For this reason, in the above-mentioned encoder, the positional information of the driven body may be erroneously detected when disturbance such as, for example, noise occurs.

An object of an aspect of the invention is to provide an encoder and a drive device which are capable of improving reliability.

Means for Solving the Problem

An encoder according to an aspect of the invention includes a sensor unit configured to output a detected signal based on positional information of a driven body; a positional information generation unit configured to generate the positional information as first positional information based on the detected signal which is output by the sensor unit; and an IIR filter unit configured to output second positional information obtained by performing filtering on the first positional information based on a predetermined filter coefficient. The IIR filter unit includes a counter unit configured to store a value corresponding to a predetermined high-order digit of the first positional information, as a count value; an input unit configured to subtract the count value stored in the counter unit from the first positional information to thereby generate input information; a delay information storage unit configured to store an internal computation result based on the input information, as delay information; a computation unit configured to generate the internal computation result based on the delay information stored in the delay information storage unit, the input information, and the predetermined filter coefficient, and generates output information on which filtering is performed an output unit configured to add the count value and the output information to thereby generate the second positional information; and a changing unit configured to change a value of the delay information based on a unit of change of the input information when the value of the delay information falls outside of a predetermined range which is set in advance, and changes the count value.

An encoder according to another aspect of the invention includes a sensor unit configured to output a detected signal based on positional information of a driven body; a positional information generation unit configured to generate the positional information as first positional information having a predetermined number of digits and circulating by the predetermined number of digits, based on the detected signal which is output by the sensor unit; and an IIR filter unit configured to output second positional information obtained by performing filtering on the first positional information based on a predetermined filter coefficient. The IIR filter unit includes a delay information storage unit configured to store an internal computation result based on the first positional information, as delay information; a computation unit configured to generate the internal computation result based on the delay information stored in the delay information storage unit, the first positional information, and the predetermined filter coefficient, and generates the second positional information; and a changing unit configured to change a value of the delay information based on a variable range of the first positional information when discontinuity due to circulation occurs in a value of the first positional information.

A drive device according to a still another aspect of the invention includes the encoder mentioned above and a driving unit configured to drive the driven body.

Advantage of the Invention

According to the aspects of the invention, it is possible to improve reliability.

DESCRIPTION OF THE EMBODIMENTS

Hereinafter, an encoder according to an embodiment of the invention will be described with reference to the accompanying drawings.

First Embodiment

Figure 1:
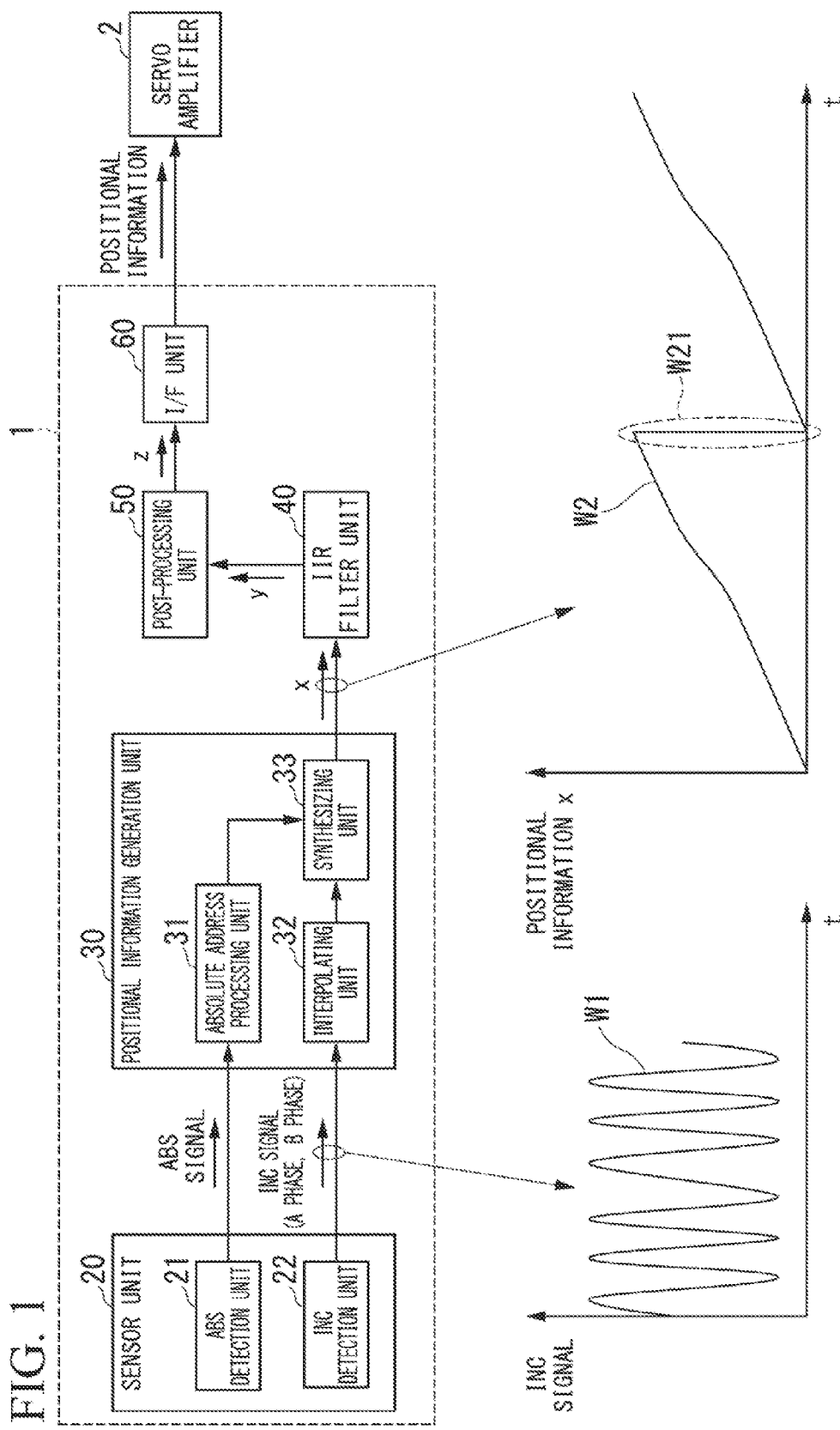
FIG. 1 is a block diagram showing an encoder according to a first embodiment.

FIG. 1 is a schematic block diagram showing an example of an encoder 1 according to this embodiment.

In FIG. 1, the encoder 1 includes a sensor unit 20, a positional information generation unit 30, an infinite impulse response (IIR) filter unit 40, a post-processing unit 50, and an interface (I/F) unit 60.

In this embodiment, a description will be made of an example in which the encoder 1 is a rotary encoder which detects positional information (for example, absolute positional information) of, for example, a rotor (driven body) and outputs the detected positional information to a servo amplifier 2. Here, the servo amplifier 2 controls a driving unit such as a motor based on the positional information of the rotor which is detected by the encoder 1. In this embodiment, an example is shown of a case where the encoder 1 performs filtering on positional information, which is generated by the positional information generation unit 30, by the IIR filter unit 40 instead of performing filtering on a detected signal detected by the sensor unit 20. Moreover, the encoder 1 in this embodiment may be configured to include both filtering for a detected signal detected by the sensor unit 20 and filtering for positional information generated by the positional information generation unit 30.

The sensor unit 20 outputs a detected signal based on positional information of a driven body (for example, a rotor). The sensor unit 20 detects, for example, an absolute pattern and an incremental pattern of a disk connected to the rotor, and outputs an absolute signal (ABS signal) and an incremental signal (INC signal) as detected signals. Here, the absolute pattern and the incremental pattern are patterns indicating positional information. Moreover, for example, the sensor unit 20 may be a unit that outputs detected signals obtained by optically detecting the above-mentioned patterns, or may be a unit that outputs detected signals obtained by magnetically detecting the above-mentioned patterns.

In addition, the sensor unit 20 includes an ABS detection unit 21 and an INC detection unit 22.

The ABS detection unit 21 includes a detection element (for example, a light receiving element or a magnetic detection element) which detects an absolute pattern, and detects an ABS signal based on the absolute pattern as a detected signal. The ABS detection unit 21 outputs the detected ABS signal to the positional information generation unit 30.

Here, the absolute pattern is a pattern indicating positional information as an absolute position. For example, an M-series pattern is formed. Here, the positional information refers to information indicating a moving angle (for example, a rotational angle), a moving position (for example, a rotational position), and the like. In addition, for example, the absolute position refers to an absolute angular position or an absolute moving position (for example, an absolute rotational position) of a rotor.

The INC detection unit 22 includes a detection element (for example, a light receiving element or a magnetic detection element) which detects an incremental pattern used for an interpolation process, and detects an INC signal based on the incremental pattern as a detected signal. Here, the INC signal is a periodic signal, for example, as shown in a waveform W1 of FIG. 1, and is used for an interpolation process of the positional information. In addition, for example, the INC signal includes two periodic signals (A phase signal and B phase signal) of which the phases are different from each other by 90 degrees.

The INC detection unit 22 outputs the detected INC signal (A phase signal and B phase signal) to the positional information generation unit 30.

The positional information generation unit 30 generates positional information as first positional information (x) based on the detected signal output by the sensor unit 20. For example, the positional information generation unit 30 generates absolute address information of a rotor based on the ABS signal output by the sensor unit 20, and performs an interpolation process based on the INC signal to thereby generate high-resolution positional information. The positional information generation unit 30 outputs the generated positional information (x) to the IIR filter unit 40.

Moreover, the positional information (x) is information having a predetermined number of digits (for example, n bits) and circulating by the predetermined number of digits (for example, circulating at 0 to $2^n-1$). That is, the positional information generation unit 30 generates the positional information (x) as circulating information, for example, as shown in a waveform W2 of FIG. 1. Here, the circulation refers to returning to a reference position (for example, 0 degrees of the origin) from the maximum value of positional information, for example, by one rotation of a rotor as shown in a portion of a partial waveform W21 of FIG. 1, or refers to returning to the maximum value of the positional information from the reference position. Here, the discontinuity of a value occurs in the positional information by the circulation. That is, when an overflow (moving up) or an underflow (moving down) occurs, the discontinuity of a value occurs in the positional information (x).

In addition, the positional information generation unit 30 includes an absolute address processing unit 31, an interpolating unit 32, and a synthesizing unit 33.

The absolute address processing unit 31 generates absolute positional information (absolute address information) of a rotor based on the ABS signal output by the ABS detection unit 21 of the sensor unit 20, and outputs the generated absolute positional information to the synthesizing unit 33. Moreover, for example, when power is supplied to the encoder 1, the absolute address processing unit 31 generates absolute address information of the rotor as an initial value of the absolute positional information. Moreover, the absolute address processing unit 31 includes, for example, an analog/digital (A/D) conversion unit (not shown) or a binarization unit (not shown), and converts the ABS signal into a digital signal and then generates the absolute positional information (absolute address information) of the rotor.

The interpolating unit 32 performs an interpolation process based on the INC signal (A phase signal and B phase signal) which is output by the INC detection unit 22 of the sensor unit 20 to thereby generate interpolated (sub-divided) positional information. The interpolating unit 32 outputs the generated positional information to the synthesizing unit 33.

Moreover, the interpolating unit 32 includes, for example, an A/D conversion unit (not shown), and converts the INC signal into a digital signal and then performs an interpolation process.

The synthesizing unit 33 generates the absolute positional information of the rotor as first positional information (x) based on the absolute positional information generated by the absolute address processing unit 31 and the interpolated positional information generated by the interpolating unit 32. That is, when power is supplied to the encoder 1, the synthesizing unit 33 synthesizes the absolute positional information generated by the absolute address processing unit 31 and the interpolated positional information generated by the interpolating unit 32 to thereby generate the first positional information (x). After power is supplied, the synthesizing unit 33 generates the first positional information (x) by counting the amount of displacement from the initial absolute positional information based on the interpolated positional information based on the INC signal. The synthesizing unit 33 outputs the generated first positional information (x) to the IIR filter unit 40.

The IIR filter unit 40 is a filter circuit that outputs second positional information (y) obtained by performing filtering on the first positional information (x) based on a predetermined filter coefficient. The IIR filter unit 40 includes, for example, a biquadratic low pass filter. Moreover, in this embodiment, an example in which the IIR filter unit 40 is a digital filter is shown, and both of the first positional information (x) as input information and the second positional information (y) as output information are digital values. The IIR filter unit 40 reduces frequency components having a predetermined frequency or higher, set in advance, which are included in the first positional information (x) based on a predetermined filter coefficient set in advance to thereby generate the second positional information (y). The IIR filter unit 40 outputs the generated second positional information (y) to the post-processing unit 50. A detailed configuration of the IIR filter unit 40 will be described later with reference to FIG. 2.

The post-processing unit 50 corrects the second positional information (y) falling outside of a variable range (range of equal to or greater than 0 degrees and less than 360 degrees (0 to $2^n-1$)) of the absolute positional information of the rotor so that the second positional information falls within the variable range, through filtering using the IIR filter unit 40. For example, the post-processing unit 50 outputs low-order bits (for example, n bits) in the second positional information (y) which correspond to a variable range of the first positional information (x) as positional information (z). That is, the post-processing unit 50 performs remainder calculation on the second positional information (y) using $2^n$ to thereby generate the positional information (z) of the variable range of the absolute positional information of the rotor, and outputs the generated positional information (z) to the I/F unit 60.

The I/F unit 60 is an interface unit that outputs the positional information of the rotor to the outside (for example, the servo amplifier 2) of the encoder 1. The I/F unit 60 performs serial data communication, for example, using a differential transmission signal conforming to the RS485 standard, and outputs the positional information (z) output from the post-processing unit 50 to the servo amplifier 2.

Next, the configuration of the IIR filter unit 40 will be described with reference to FIG. 2.

Figure 2:
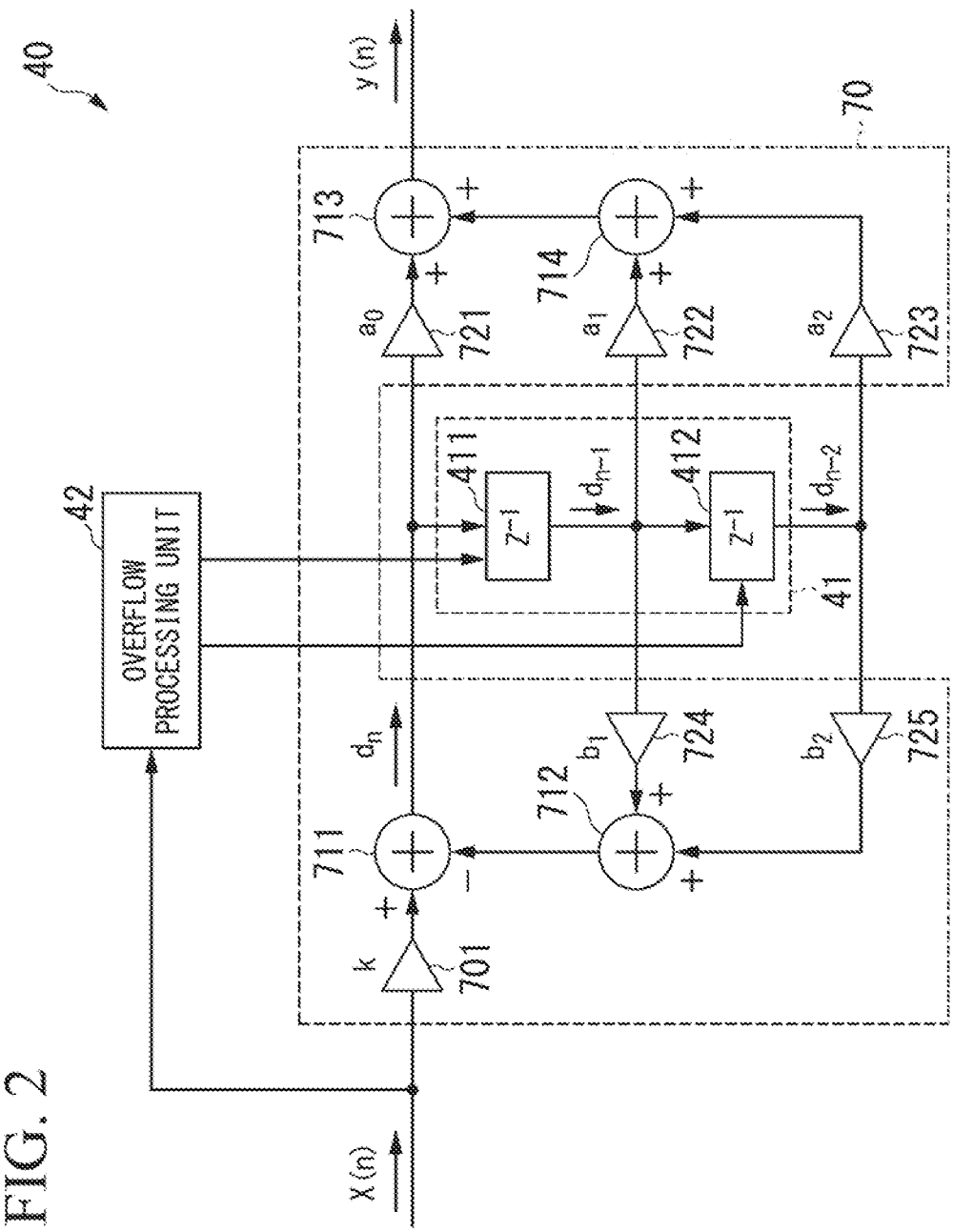
FIG. 2 is a block diagram showing an IIR filter unit according to the first embodiment.

FIG. 2 is a schematic block diagram showing an example of the configuration of the IIR filter unit 40 according to this embodiment.

In FIG. 2, the IIR filter unit 40 includes a delay information storage unit 41, an overflow processing unit 42, and a computation unit 70.

Moreover, the IIR filter unit 40 in this embodiment is a biquadratic low pass filter (LPF) in which a transfer function based on z-transform is shown by the following Expression (1).

[Expression 1]

$$H(z) = k\frac{a_0 + a_1 z^{-1} + a_2 z^{-2}}{1 + b_1 z^{-1} + b_2 z^{-2}} \quad (1)$$

Here, coefficients k, $a_0$, $a_1$, $a_2$, $b_1$, and $b_2$ denote filter coefficients.

Here, the filter coefficients $a_0$, $a_1$, and $a_2$ are, for example, $a_0=1$, $a_1=2$, and $a_2=1$, respectively. In addition, $z^{-1}$ denotes a delay by a predetermined sampling period (predetermined unit time), and $z^{-2}$ denotes a delay by two periods (two unit times) of a predetermined sampling period.

Moreover, for example, the IIR filter unit 40 is a filter circuit having a one-time DC gain.

In addition, input information (x) as data circulating in a range of, for example, −0.5 to +0.5 is input to the IIR filter unit 40. Here, for example, when 0 degrees to 360 degrees which are absolute positions for one rotation are expressed by the form of a binary number such as 0 to $2^n-1$, the input information (x) is expressed by rereading the binary form (converting it into) as −0.5 to +0.5.

The delay information storage unit 41 stores an internal computation result ($d_n$) based on input information (x(n)) as delay information ($d_{n-1}$ and $d_{n-2}$) for each unit time. The delay information storage unit 41 stores information of the respective stages which are obtained by delaying the internal computation result ($d_n$) by a plurality of stages (for example, two stages) for each unit time (sampling period), as a plurality of pieces of delay information ($d_{n-1}$ and $d_{n-2}$). The delay information storage unit 41 includes a computation result storage unit 411 and a computation result storage unit 412.

The computation result storage unit 411 stores the internal computation result ($d_n$) for each unit time, and outputs the stored result as first stage delay information ($d_{n-1}$) corresponding to $z^{-1}$ mentioned above. The computation result storage unit 411 outputs the stored first stage delay information ($d_{n-1}$) to the computation result storage unit 412 and multipliers (722 and 724) to be described later. Here, the first stage delay information ($d_{n-1}$) corresponds to the internal computation result of one time before. In the computation result storage unit 411, the value of the delay information ($d_{n-1}$) is changed by the overflow processing unit 42 to be described later. For example, in the computation result storage unit 411, the value of the delay information is changed through a process of increasing and decreasing a predetermined value (for example, ±0.25) using the overflow processing unit 42 and a process of setting any value for initialization.

The computation result storage unit 412 stores the first stage delay information ($d_{n-1}$) for each unit time and outputs the stored information as second stage delay information ($d_{n-2}$) corresponding to $z^{-2}$ mentioned above. The computation result storage unit 412 outputs the stored second stage delay information ($d_{n-2}$) to multipliers (723 and 725) to be described later. Here, the second stage delay information ($d_{n-2}$) corresponds to an internal computation result of two times before (=first stage delay information of one time before). In the computation result storage unit 412, the value of the delay information ($d_{n-2}$) is changed by the overflow processing unit 42 to be described later.

The computation unit 70 generates the internal computation result ($d_n$) based on the pieces of delay information ($d_{n-1}$ and $d_{n-2}$) stored in the delay information storage unit 41, the first positional information (x(n)), and the predetermined filter coefficients (k, $a_0$, $a_1$, $a_2$, $b_1$, and $b_2$) which are set in advance, and generates second positional information (y(n)). The computation unit 70 generates the internal computation result ($d_n$) based on, for example, the pieces of delay information ($d_{n-1}$ and $d_{n-2}$), the first positional information (x(n)) which is the input information of the IIR filter unit 40, and the predetermined filter coefficients (k, $b_1$, and $b_2$). In addition, the computation unit 70 generates second positional information (y(n)) which is output information of the IIR filter unit 40, based on, for example, the internal computation result ($d_n$), the pieces of delay information ($d_{n-1}$ and $d_{n-2}$), and the predetermined filter coefficients ($a_0$, $a_1$, and $a_2$). Here, since the coefficient $a_0=1$, the coefficient $a_1=2$, and the coefficient $a_2=1$, the computation unit 70 generates the second positional information (y(n)) as the sum of values obtained by multiplying each of the plurality of pieces of delay information ($d_{n-1}$ and $d_{n-2}$) and the internal computation result ($d_n$) by an integer.

In addition, the computation unit 70 includes a multiplier 701, a subtracter 711, adders 712 to 714, and multipliers 721 to 725.

The multiplier 701 multiplies the input information (x(n)) supplied to the IIR filter unit 40 by the coefficient k and outputs the multiplication result to the subtracter 711.

The subtracter 711 subtracts a computation result output by the adder 712 to be described later from a computation result output by the multiplier 701, and outputs the internal computation result ($d_n$) as the subtraction computation result. The subtracter 711 outputs the internal computation result ($d_n$) to the computation result storage unit 411 and the multiplier 721. Here, the coefficient $a_0=1$, the coefficient $a_1=2$, and the coefficient $a_2=1$. Thus, when the input information (x(n)) sufficiently changes slowly with respect to a sampling period, the subtracter 711 outputs a value close to ¼ (quarter) of the input information (x(n)) as the internal computation result ($d_n$).

The multiplier 721 multiplies the internal computation result ($d_n$) output by the subtracter 711 by the coefficient $a_0$ (=1) and outputs the multiplication computation result to the adder 713. Moreover, when the coefficient $a_0=1$, a configuration in which the multiplier 721 is omitted (is not included) may be adopted.

The adder 713 adds the computation result output by the multiplier 721 and a computation result output by the adder 714 to be described later, and outputs the second positional information (y(n)) as the addition computation result.

The multiplier 722 multiplies the delay information ($d_{n-1}$) output by the computation result storage unit 411 by the coefficient $a_1$ (=2), and outputs the multiplication computation result to the adder 714. Moreover, when the coefficient $a_1=2$, the multiplier 721 may be replaced by left shifting of one bit.

The multiplier 723 multiplies the delay information ($d_{n-2}$) output by the computation result storage unit 412 by the coefficient $a_2$ (=1), and outputs the multiplication computation result to the adder 714. Moreover, when the coefficient $a_2=1$, a configuration in which the multiplier 722 is omitted (is not included) may be adopted.

The adder 714 adds the computation result output by the multiplier 722 and the computation result output by the multiplier 723, and outputs the addition computation result to the adder 713.

The multiplier 724 multiplies the delay information ($d_{n-1}$) output by the computation result storage unit 411 by the coefficient $b_1$, and outputs the multiplication computation result to the adder 712.

The multiplier 725 multiplies the delay information ($d_{n-2}$) output by the computation result storage unit 412 by the coefficient $b_2$, and outputs the multiplication computation result to the adder 712.

The adder 712 adds the computation result output by the multiplier 724 and the computation result output by the multiplier 725, and outputs the addition computation result to the adder 713.

Moreover, when the coefficient $a_0=1$, the coefficient $a_1=2$, and the coefficient $a_2=1$ and the input information (x(n)) sufficiently changes slowly with respect to a sampling period, the coefficient $b_1$ and the coefficient $b_2$ are set in advance so that the internal computation result ($d_n$) is set to have a value close to ¼ of the input information (x(n)).

When discontinuity due to circulation as shown in the partial waveform W21 of FIG. 1 occurs in the value of the input information (x(n)) which is the first positional information, the overflow processing unit 42 (changing unit) changes the values of the pieces of delay information ($d_{n-1}$ and $d_{n-2}$) based on a variable range (for example, range of −0.5 to +0.5) of the first positional information. Here, the variable range of the first positional information refers to a range in which the first positional information circulates, and the size of the discontinuity in a case where discontinuity due to the circulation occurs is coincident with the size of the variable range. For example, when the input information (x(n)) is moved up from near +0.5 and changed to near −0.5, the overflow processing unit 42 changes the values of the pieces of delay information ($d_{n-1}$ and $d_{n-2}$) stored respectively in the computation result storage unit 411 and the computation result storage unit 412. In this case, for example, the overflow processing unit 42 changes the values of the pieces of delay information ($d_{n-1}$ and $d_{n-2}$) stored respectively in the computation result storage unit 411 and the computation result storage unit 412 to values changed by −0.25 (values subtracted by 0.25).

In addition, for example, when the input information (x(n)) is moved down from near −0.5 and changed to near +0.5, the overflow processing unit 42 changes the values of the pieces of delay information ($d_{n-1}$ and $d_{n-2}$) stored respectively in the computation result storage unit 411 and the computation result storage unit 412. In this case, for example, the overflow processing unit 42 changes the values of the pieces of delay information ($d_{n-1}$ and $d_{n-2}$) stored respectively in the computation result storage unit 411 and the computation result storage unit 412 to values changed by +0.25 (values added by 0.25).

As described above, in this embodiment, when discontinuity due to the circulation occurs in the value of the input information (x(n)), the overflow processing unit 42 changes the values of the pieces of delay information ($d_{n-1}$ and $d_{n-2}$) so that discontinuity due to the circulation does not occur in the values of the pieces of delay information ($d_{n-1}$ and $d_{n-2}$) stored respectively in the computation result storage unit 411 and the computation result storage unit 412 (so that the influence of discontinuity is reduced).

Next, an operation of the encoder 1 according to this embodiment will be described with reference to the accompanying drawings.

Figure 3:
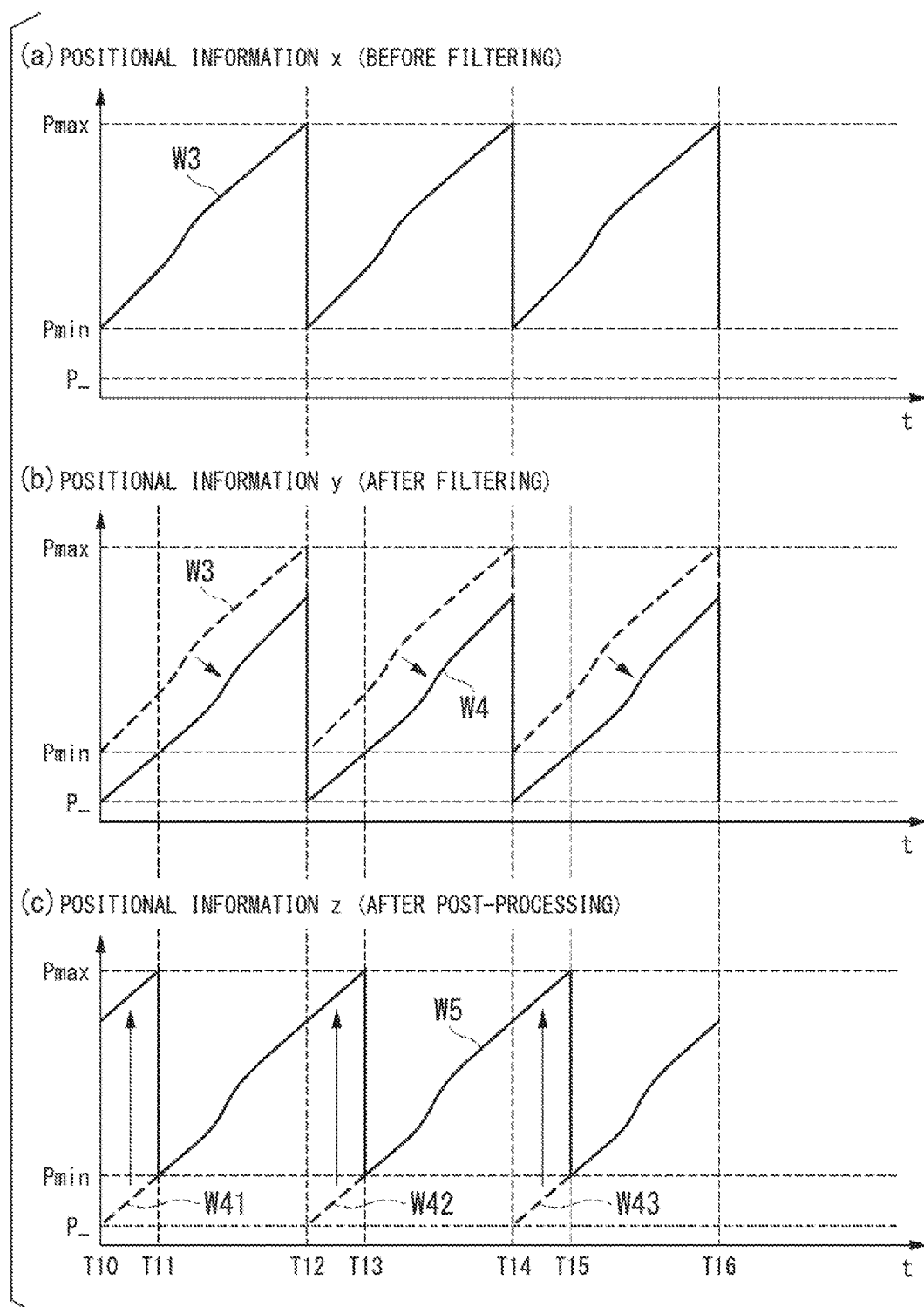
FIG. 3 is a diagram showing an example of an operation of the encoder according to the first embodiment.
Figure 4:
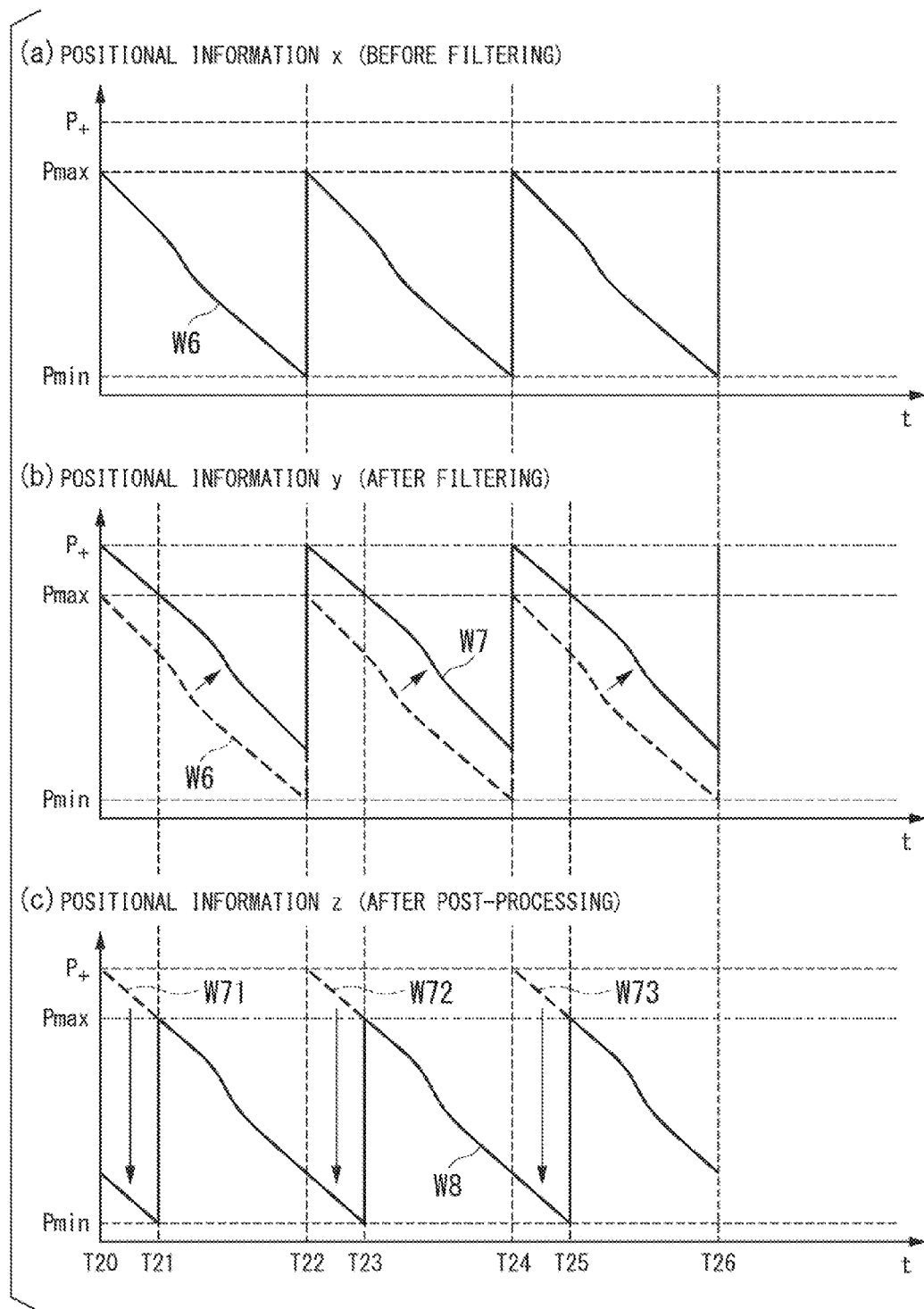
FIG. 4 is a diagram showing another example of an operation of the encoder according to the first embodiment.

FIGS. 3 and 4 are diagrams showing an example of an operation of the encoder 1 according to this embodiment.

FIG. 3 shows an example of an operation when a rotor is rotating continuously in a moving-up direction of positional information. In addition, FIG. 4 shows an example of an operation when a rotor is rotating continuously in a moving-down direction of positional information.

FIGS. 3(a) and 4(a) show output waveforms (a waveform W3 and a waveform W6) of the first positional information (x) output by the positional information generation unit 30, respectively. In addition, FIGS. 3(b) and 4(b) show output waveforms (a waveform W4 and a waveform W7) of the second positional information (y) output by the IIR filter unit 40, respectively. In addition, FIGS. 3(c) and 4(c) show output waveforms (a waveform W5 and a waveform W8) of the positional information (z) output by the post-processing unit 50, respectively.

First, the overall operation of the encoder 1 according to this embodiment will be described.

In the encoder 1 according to this embodiment, the positional information generation unit 30 generates positional information as the first positional information (x) based on the detected signals (ABS signal and INC signal) output by the sensor unit 20. For example, when power is supplied to the encoder 1, the synthesizing unit 33 of the positional information generation unit 30 synthesizes the absolute positional information generated by the absolute address processing unit 31 based on the ABS signal and the interpolated positional information generated by the interpolating unit 32 based on the INC signal to thereby generate the first positional information (x). After power is supplied, the synthesizing unit 33 counts the amount of displacement from the initial absolute positional information based on the interpolated positional information based on the INC signal to thereby generate the first positional information (x). Here, the synthesizing unit 33 outputs the pieces of first positional information (x) as shown in the waveform W3 of FIG. 3(a) and the waveform W6 of FIG. 4(a) to the IIR filter unit 40. Moreover, the values of the pieces of first positional information (x) are set to values in a range of, for example, a minimum position Pmin (=−0.5) to a maximum position Pmax (=+0.5).

Next, the IIR filter unit 40 performs filtering of reducing components having a predetermined frequency or higher, which is set in advance, on the first positional information (x) generated by the positional information generation unit 30 to thereby generate pieces of second positional information (y) as shown in the waveform W4 of FIG. 3(b) and the waveform W7 of FIG. 4(b). Here, a delay occurs in the second positional information (y) with respect to the first positional information (x). In addition, when discontinuity due to circulation occurs, the IIR filter unit 40 changes the pieces of delay information ($d_{n-1}$ and $d_{n-2}$). Thus, in the second positional information (y), a value falling outside of a range of a minimum position Pmin (=−0.5) to a maximum position Pmax (=+0.5) appears.

For example, in FIG. 3(b), the IIR filter unit 40 changes the pieces of delay information ($d_{n-1}$ and $d_{n-2}$) stored in the delay information storage unit 41 at time T10, time T12, time T14, time T15, and time T16. For this reason, in the second positional information (y), a value (for example, a value P. of positional information) which falls outside of the range of the minimum position Pmin (=−0.5) to the maximum position Pmax (=+0.5) appears at time T10, time T12, time T14, time T15, and time T16.

For example, in FIG. 4(b), the IIR filter unit 40 changes the pieces of delay information ($d_{n-1}$ and $d_{n-2}$) stored in the delay information storage unit 41 at time T20, time T22, time T24, time T25, and time T26. For this reason, in the second positional information (y), a value (for example, a value $P_+$ of positional information) which falls outside of the range of the minimum position Pmin (=−0.5) to the maximum position Pmax (=+0.5) appears at time T20, time T22, time T24, time T25, and time T26.

Next, the post-processing unit 50 corrects the second positional information (y) output by the IIR filter unit 40 to positional information (z) as shown in the waveform W5 of FIG. 3(b) and the waveform W8 of FIG. 4(b) so that the second positional information falls within a variable range (within a range of −0.5 to +0.5) of the positional information of the rotor. For example, the post-processing unit 50 outputs low-order bits (for example, n bits) in the second positional information (y) which correspond to a variable range of the first positional information (x) as positional information (z).

For example, the post-processing unit 50 performs correction so that a portion of a partial waveform W41 in the second positional information (y) falls within the variable range (within the range of −0.5 to +0.5) at time T10 to time T11 of FIG. 3(c). Similarly, the post-processing unit 50 performs correction so that a portion of a partial waveform W42 in the second positional information (y) falls within the variable range (within the range of −0.5 to +0.5) at time T12 to time T13 of FIG. 3(c). Similarly, the post-processing unit 50 performs correction so that a portion of a partial waveform W43 in the second positional information (y) falls within the variable range (within the range of −0.5 to +0.5) at time T14 to time T15 of FIG. 3(c).

In addition, for example, the post-processing unit 50 performs correction so that a portion of a partial waveform W71 in the second positional information (y) falls within the variable range (within the range of −0.5 to +0.5) at time T20 to time T21 of FIG. 4(c). Similarly, the post-processing unit 50 performs correction so that a portion of a partial waveform W72 in the second positional information (y) falls within the variable range (within the range of −0.5 to +0.5) at time T22 to time T23 of FIG. 4(c). Similarly, the post-processing unit 50 performs correction so that a portion of a partial waveform W73 in the second positional information (y) falls within the variable range (within the range of −0.5 to +0.5) at time T24 to time T25 of FIG. 4(c).

Next, the I/F unit 60 outputs the positional information, which is output from the post-processing unit 50, to the outside (for example, the servo amplifier 2) of the encoder 1.

Next, operations of the IIR filter unit 40 and the post-processing unit 50 according to this embodiment will be described.

Figure 5:
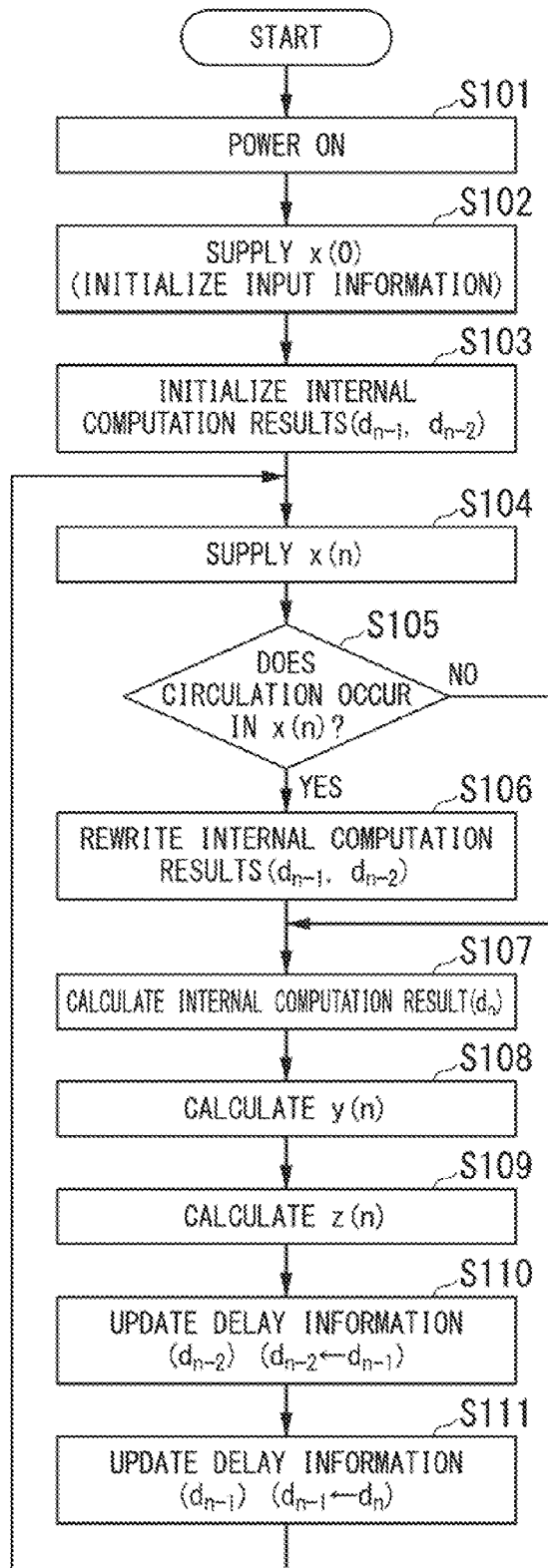
FIG. 5 is a flow chart showing an example of operations of the IIR filter unit and a post-processing unit according to the first embodiment.

FIG. 5 is a flow chart showing an example of operations of the IIR filter unit 40 and the post-processing unit 50 according to this embodiment.

In FIG. 5, first, power is supplied to the encoder 1 (power on) (step S101).

Next, the positional information generation unit 30 supplies input information (x(0)) to the IIR filter unit 40 (step S102). That is, the positional information generation unit 30 supplies an initial value (x(0)) of input information to the IIR filter unit 40 to thereby initialize the input information.

Next, the IIR filter unit 40 initializes pieces of delay information ($d_{n-1}$ and $d_{n-2}$) which are internal computation results (step S103). That is, the computation unit 70 of the IIR filter unit 40 calculates an internal computation result ($d_n$) corresponding to ¼ of the input information (x(0)) based on the initial value (x(0)) of the input information, and causes the computation result storage unit 411 and the computation result storage unit 412 to sequentially store the calculated internal computation result ($d_n$). Thus, the IIR filter unit 40 initializes the pieces of delay information ($d_{n-1}$ and $d_{n-2}$). That is, the IIR filter unit 40 continuously supplies the input information (x(0)) for a period which is sufficiently longer than a sampling period to thereby initialize the pieces of delay information ($d_{n-1}$ and $d_{n-2}$) to a value of ¼ of the input information (x(0)). In addition, the IIR filter unit 40 directly rewrites the pieces of delay information ($d_{n-1}$ and $d_{n-2}$) using a signal from the overflow processing unit 42 to thereby initialize the pieces of delay information to a value of ¼ of the input information (x(0)).

Next, the positional information generation unit 30 supplies the input information (x(n)) to the IIR filter unit 40 (step S104). That is, the positional information generation unit 30 generates positional information and supplies the generated positional information to the IIR filter unit 40 as the input information (x(n)).

Next, the overflow processing unit 42 determines whether or not circulation occurs in the value of the input information (x(n)) which is the first positional information (step S105). That is, the overflow processing unit 42 determines whether or not discontinuity due to the circulation occurs in the value of the input information (x(n)). When the overflow processing unit 42 determines that discontinuity due to the circulation occurs (step S105: YES), the process in the overflow processing unit proceeds to step S106. In addition, when the overflow processing unit 42 determines that discontinuity due to the circulation does not occur (step S105: NO), the process in the overflow processing unit proceeds to step S107.

In step S106, the overflow processing unit 42 rewrites the values of the pieces of delay information ($d_{n-1}$ and $d_{n-2}$) stored respectively in the computation result storage unit 411 and the computation result storage unit 412 based on the variable range (for example, range of −0.5 to +0.5) of the first positional information. That is, the overflow processing unit 42 changes the values of the pieces of delay information ($d_{n-1}$ and $d_{n-2}$) so that the influence of discontinuity due to the circulation is reduced in the values of the pieces of delay information ($d_{n-1}$ and $d_{n-2}$) which are internal computation results. After the overflow processing unit 42 changes the values of the pieces of delay information ($d_{n-1}$ and $d_{n-2}$), the process proceeds to step S107.

Next, in step S107, the computation unit 70 calculates the internal computation result ($d_n$).

That is, the computation unit 70 generates the internal computation result ($d_n$) based on the pieces of delay information ($d_{n-1}$ and $d_{n-2}$) stored in the delay information storage unit 41, the input information (x(n)), and the predetermined filter coefficients (k, $b_1$, and $b_2$). Here, for example, the multipliers (701, 724, and 725), the subtracter 711, and the adder 712 of the computation unit 70 generate the internal computation result ($d_n$).

Next, the computation unit 70 calculates output information (y(n)) (step S108). That is, the computation unit 70 generates the output information (y(n)) based on the internal computation result ($d_n$), the pieces of delay information ($d_{n-1}$ and $d_{n-2}$) stored in the delay information storage unit 41, and the predetermined filter coefficients ($a_0$, $a_1$, and $a_2$). Here, for example, the multipliers (721, 722, and 723) and the adders (713 and 714) of the computation unit 70 generate the output information (y(n)) which is second positional information.

Next, the post-processing unit 50 calculates positional information (z(n)) (step S109). That is, as shown in FIGS. 3(c) and 4(c), the post-processing unit 50 generates the positional information (z(n)) so that the second positional information (y) output by the IIR filter unit 40 falls within the variable range (within the range of −0.5 to +0.5) of the positional information of the rotor.

Next, the computation result storage unit 412 of the delay information storage unit 41 updates the delay information ($d_{n-2}$) (step S110). That is, the computation result storage unit 412 stores the delay information ($d_{n-1}$) stored in the computation result storage unit 411 as the delay information ($d_{n-2}$).

Next, the computation result storage unit 411 of the delay information storage unit 41 updates the delay information ($d_{n-1}$) (step S111). That is, the computation result storage unit 411 stores the internal computation result ($d_n$) calculated by the computation unit 70 as the delay information ($d_{n-1}$).

The process in the IIR filter unit 40 returns to step S104 after the process of step S110, and the processes of step S104 to step S110 are repeated. Moreover, in the IIR filter unit 40, a series of processes of step S104 to step S110 are performed for each unit time (sampling period).

As described above, in the encoder 1 according to this embodiment, the sensor unit 20 outputs detected signals (for example, an ABS signal and an INC signal) based on the positional information of the rotor. The positional information generation unit 30 generates positional information (x) as first positional information based on the detected signals output by the sensor unit 20. Here, the positional information (x) is information having a predetermined number of digits and circulating by the predetermined number of digits. The IIR filter unit 40 outputs second positional information (y) obtained by performing filtering on the first positional information (x) based on a predetermined filter coefficient. In the IIR filter unit 40, the delay information storage unit 41 stores the internal computation result ($d_n$) based on the first positional information (x), as delay information (for example, $d_{n-1}$ and $d_{n-2}$). The computation unit 70 generates the internal computation result ($d_n$) based on the delay information stored in the delay information storage unit 41, the first positional information (x), and the predetermined filter coefficient, and generates the second positional information (y). When discontinuity due to circulation occurs in the value of the first positional information (x), the overflow processing unit 42 changes the value of the delay information (for example, $d_{n-1}$ and $d_{n-2}$) based on a variable range (range of, for example, −0.5 to +0.5) of the first positional information (x).

Thus, since the encoder 1 according to this embodiment performs filtering on the positional information (x) generated by the positional information generation unit 30, characteristics of the IIR filter unit 40 are not restricted due to, for example, a frequency of the detected signal (INC signal). For this reason, the encoder 1 according to this embodiment can expand a frequency range capable of reducing disturbance (noise) by the IIR filter unit 40. For example, the encoder 1 according to this embodiment can reduce influence due to disturbance (noise) which is equal to or less than the maximum frequency of the INC signal. Therefore, the encoder 1 according to this embodiment can reduce the erroneous detection of positional information of a driven body (for example, a rotor).

In addition, when discontinuity due to circulation occurs in the value of the first positional information (x), the overflow processing unit 42 changes the value of delay information (for example, $d_{n-1}$ and $d_{n-2}$) based on a variable range (for example, range of −0.5 to +0.5) of the first positional information (x). Thus, the IIR filter unit 40 can reduce influence due to the above-mentioned discontinuity due to circulation in the values of the pieces of delay information ($d_{n-1}$ and $d_{n-2}$) which are internal computation results. For this reason, for example, even when discontinuity due to circulation occurs in positional information, the encoder 1 according to this embodiment can reduce the erroneous detection of positional information of a driven body (for example, a rotor).

Further, since the IIR filter unit 40 is constituted by an IIR filter, the IIR filter unit can be simply configured with a small computation amount. For this reason, the encoder 1 according to this embodiment can reduce the erroneous detection of positional information of a driven body (for example, a rotor) through a simple configuration and can improve reliability.

Incidentally, in an encoder of the related art which includes a filter unit in an INC signal, the switching of frequency characteristics of the filter unit according to a rotational speed of a rotor or stopping using the filter unit is considered in order to reduce influence due to disturbance (noise) which is equal to or less than the maximum frequency of the INC signal. In this case, a delay amount for outputting positional information varies depending on the rotational speed of the rotor in the encoder of the related art, and thus a motor of, for example, a robot device cannot be accurately controlled. On the other hand, the encoder 1 according to this embodiment can expand a frequency range capable of reducing disturbance (noise) without changing a delay amount for outputting positional information. For this reason, the encoder 1 according to this embodiment can accurately control, for example, a motor of a robot device.

In this embodiment, the delay information storage unit 41 stores information obtained by delaying the internal computation result for each unit time, as a plurality of pieces of delay information ($d_{n-1}$ and $d_{n-2}$). The computation unit 70 generates the second positional information (y) as the sum of values obtained by multiplying each of the plurality of pieces of delay information ($d_{n-1}$ and $d_{n-2}$) and the internal computation result ($d_n$) by an integer.

Thus, the encoder 1 according to this embodiment can generate the second positional information (y) with a simple configuration having a small computation amount. For this reason, the encoder 1 according to this embodiment can reduce the erroneous detection of positional information of a driven body (for example, a rotor) and can improve reliability with a simple configuration.

In addition, the encoder 1 according to this embodiment includes the post-processing unit 50 that outputs low-order bits in the second positional information (y) which correspond to a variable range of the first positional information (x) as positional information (z).

Thus, when discontinuity due to circulation occurs in positional information, the encoder 1 according to this embodiment can convert the second positional information (y) into the variable range of the first positional information (x). In this case, since the post-processing unit 50 is simply configured to output low-order bits as the positional information (z), the encoder 1 according to this embodiment can convert the second positional information (y) into the variable range of the first positional information (x).

In this embodiment, the IIR filter unit 40 includes a biquadratic low pass filter. Thus, the IIR filter unit 40 can be simply configured with a small computation amount.

Next, a second embodiment will be described with reference to the accompanying drawings.

Second Embodiment

Figure 6:
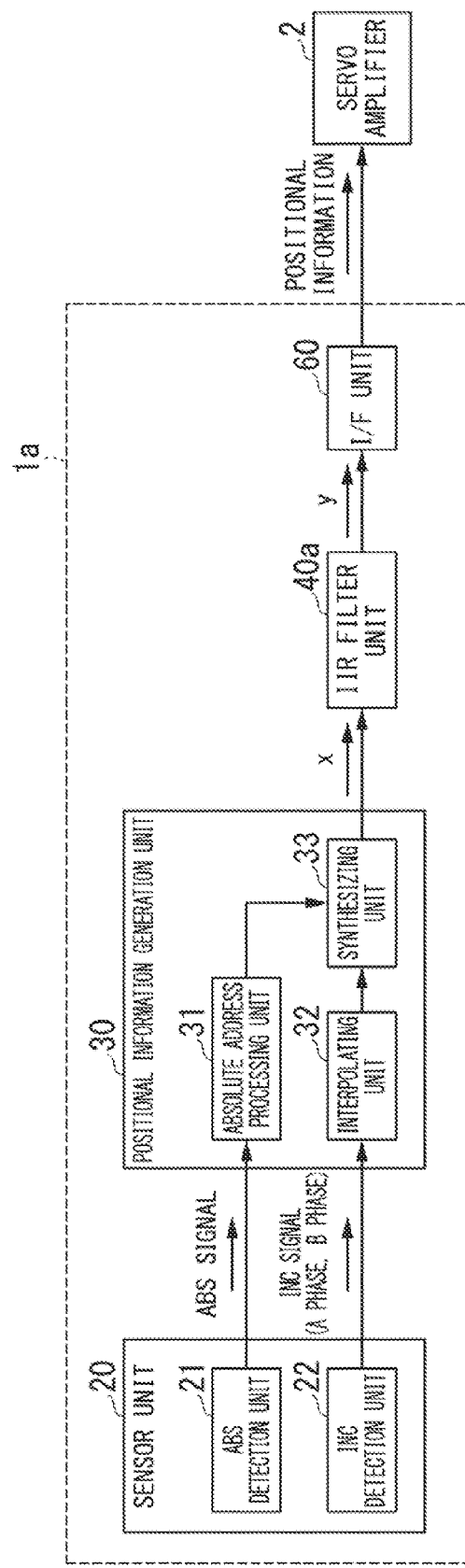
FIG. 6 is a block diagram showing an encoder according to a second embodiment.

FIG. 6 is a schematic block diagram showing an example of an encoder 1a according to this embodiment.

In FIG. 6, the encoder 1a includes a sensor unit 20, a positional information generation unit 30, an IIR filter unit 40a, and an I/F unit 60. In the diagram, the same components as those in FIG. 1 will be denoted by the same reference numerals and signs, and the description thereof will be omitted here.

In this embodiment, similarly to the first embodiment, a description will be made of an example in which the encoder 1a is a rotary encoder which detects positional information (for example, absolute positional information) of, for example, a rotor (driven body) and outputs the detected positional information to a servo amplifier 2. An example is shown of a case where the encoder 1a performs filtering on positional information, which is generated by the positional information generation unit 30, by the IIR filter unit 40a instead of performing filtering on a detected signal detected by the sensor unit 20.

In addition, the encoder 1a according to this embodiment is different from the encoder 1 according to the first embodiment in that a post-processing unit 50 is not provided and the configuration of the IIR filter unit 40a is different.

The IIR filter unit 40a is a filter circuit that outputs second positional information (y) obtained by performing filtering on first positional information (x) based on a predetermined filter coefficient. The IIR filter unit 40a includes, for example, a biquadratic low pass filter. Moreover, in this embodiment, an example in which the IIR filter unit 40a is a digital filter is shown, and both of the first positional information (x) and the second positional information (y) as output information are digital values. The IIR filter unit 40a reduces frequency components having a predetermined frequency or higher, set in advance, which are included in the first positional information (x) based on a predetermined filter coefficient set in advance to thereby generate the second positional information (y).

Moreover, here, a range of the first positional information (x) is arbitrary and is, for example, positional information in which the above-mentioned circulation does not occur. In addition, it is assumed that the first positional information (x) changes slowly to some extent (for example, it takes approximately 10 cycles of a sampling period to change the information by "1"). Here, "1" is not limited to, for example, one pulse of the INC signal and one rotation of the rotor, and may be determined by determining a scale (range) of the first positional information (x) of the IIR filter unit 40a by inverse calculation from a specification of the maximum speed of the rotor and by performing conversion based on the scale.

Next, the configuration of the IIR filter unit 40a will be described.

Figure 7:
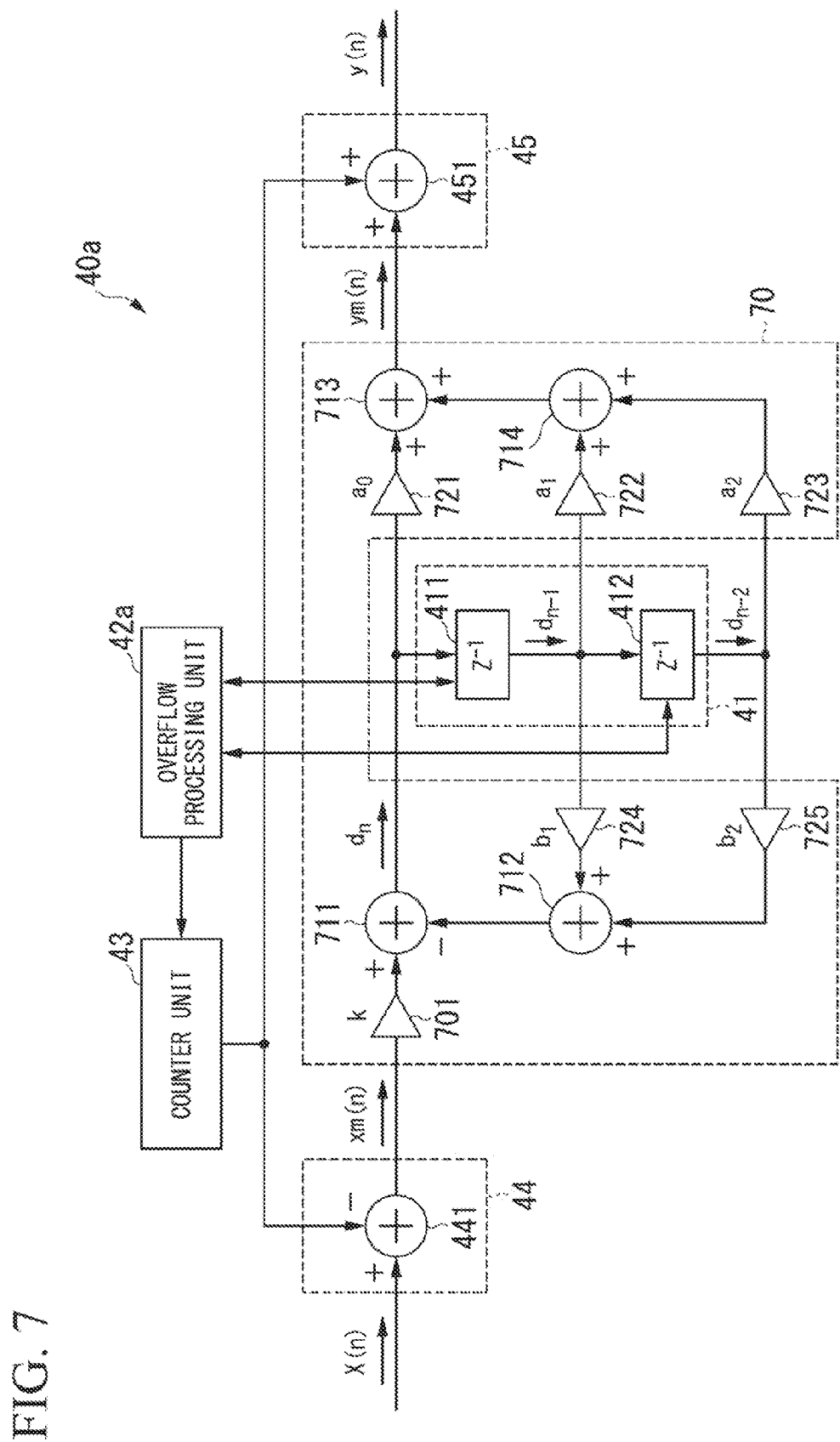
FIG. 7 is a block diagram showing an IIR filter unit according to the second embodiment.

FIG. 7 is a block diagram showing the IIR filter unit 40a according to this embodiment.

The IIR filter unit 40a includes a delay information storage unit 41, an overflow processing unit 42a, a counter unit 43, an input processing unit 44, an output processing unit 45, and a computation unit 70. In the diagram, the same components as those in FIG. 2 will be denoted by the same reference numerals and signs, and the description thereof will be omitted here.

The counter unit 43 stores a value corresponding to a predetermined high-order digit (for example, a high-order bit) of the first positional information (x) as a count value. The counter unit 43 is a counter circuit that changes the count value using "1" mentioned above as a unit of change.

In addition, the counter unit 43 changes the count value based on a command of the overflow processing unit 42a.

The input processing unit 44 (input unit) subtracts the count value stored in the counter unit 43 from the first positional information (x) to thereby generate input information (xm). That is, the input processing unit 44 subtracts the predetermined high-order digit corresponding to the count value from the first positional information (x) to thereby generate the input information (xm) with a reduced number of processing digits (the number of processing bits). The input processing unit 44 outputs the generated input information (xm) to the computation unit 70.

Here, for example, the input processing unit 44 includes a subtracter 441. The subtracter 441 subtracts the count value stored in the counter unit 43 from first positional information (x(n)) output from the positional information generation unit 30 to thereby generate input information (xm(n)), and outputs the generated input information (xm (n)) to the computation unit 70. Here, a unit of change of the input information (xm) corresponds to the size (for example, "1") of discontinuity occurring in the input information (xm) due to overflow processing (a change in the count value).

Moreover, the computation unit 70 according to this embodiment generates output information (ym) based on the input information (xm) mentioned above. Here, a unit of change of the output information (ym) corresponds to the size (for example, "1") of discontinuity occurring in the output information (ym) due to overflow processing (a change in the count value).

The output processing unit 45 (output unit) adds the count value stored in the counter unit 43 and the output information (ym) to be described later to thereby generate second positional information (y). That is, the output processing unit 45 adds the output information (ym) output by the computation unit 70 and the predetermined high-order digit corresponding to the count value to thereby generate the second positional information (y) having the number of processing digits (the number of processing bits) of the original first positional information (x). The output processing unit 45 outputs the generated second positional information (y) to the I/F unit 60.

Here, for example, the output processing unit 45 includes an adder 451. The adder 451 adds the output information (ym(n)) output from the computation unit 70 and the count value stored in the counter unit 43 to thereby generate second positional information (y(n)), and outputs the generated second positional information (y(n)) to the I/F unit 60.

When the values of the pieces of delay information ($d_{n-1}$ and $d_{n-2}$) stored in the delay information storage unit 41 fall outside of a predetermined range which is set in advance, the overflow processing unit 42a (changing unit) changes the values of the pieces of delay information ($d_{n-1}$ and $d_{n-2}$) based on a unit of change (for example, a unit of ±1) of the input information (xm(n)). The overflow processing unit 42a changes the values of the pieces of delay information ($d_{n-1}$ and $d_{n-2}$) and changes the count value stored in the counter unit 43.

Here, the above-mentioned predetermined range is a range of, for example, −0.125 to +0.125, and is set in advance based on the unit of change (for example, a unit of ±1) of the input information (xm(n)) and predetermined filter coefficients (for example, $a_0=1$, $a_1=2$, and $a_2=1$). That is, since the coefficient $a_0=1$, the coefficient $a_1=2$, and the coefficient $a_2=1$, the subtracter 711 outputs a value close to ¼ (quarter) of the input information (xm(n)) as an internal computation result ($d_n$), for example, when the input information (xm(n)) is changing sufficiently slowly with respect to a sampling period. For this reason, when the input information (xm(n)) circulates in a range of, for example, −0.5 to +0.5, the internal computation result ($d_n$) is set to be in a range of, for example, −0.125 to +0.125. Consequently, in this embodiment, the above-mentioned predetermined range is set in advance to a range of, for example, −0.125 to +0.125. Moreover, the predetermined range can be selectively set in accordance with the number of filtering processes and a computation corresponding range of the input information (xm(n)).

In addition, the overflow processing unit 42a changes the values of the pieces of delay information ($d_{n-1}$ and $d_{n-2}$) so that the values of the pieces of delay information ($d_{n-1}$ and $d_{n-2}$) fall within the above-mentioned predetermined range (range of, for example, −0.125 to +0.125). For example, when the values of the pieces of delay information ($d_{n-1}$ and $d_{n-2}$) are set to be equal to or greater than +0.125, the overflow processing unit 42a changes the values of the pieces of delay information ($d_{n-1}$ and $d_{n-2}$) stored respectively in the computation result storage unit 411 and the computation result storage unit 412 to values changed by −0.25 (values subtracted by 0.25). In addition, for example, when the values of the pieces of delay information ($d_{n-1}$ and $d_{n-2}$) are set to be equal to or less than −0.125, the overflow processing unit 42a changes the values of the pieces of delay information ($d_{n-1}$ and $d_{n-2}$) stored respectively in the computation result storage unit 411 and the computation result storage unit 412 to values changed by +0.25 (values added by 0.25).

In addition, when the overflow processing unit 42a changes the count value stored in the counter unit 43, the overflow processing unit causes the counter unit 43 to change the count value in the above-mentioned unit of change (for example, a unit of ±1). For example, when the values of the pieces of delay information ($d_{n-1}$ and $d_{n-2}$) are set to equal to or greater than +0.125, the overflow processing unit 42a causes the counter unit 43 to change the count value by counting +1. In this case, the count value changes, and second positional information (y) to be generated next time is set to have an addition value of the count value and the output information (ym(n)), and thus the discontinuity of the second positional information (y) does not occur.

In addition, for example, when the values of the pieces of delay information ($d_{n-1}$ and $d_{n-2}$) are set to equal to or less than −0.125, the overflow processing unit 42a causes the counter unit 43 to change the count value by counting −1. In this case, the count value changes, and second positional information (y) to be generated next time is set to have an addition value of the count value and the output information (ym(n)), and thus the discontinuity of the second positional information (y) does not occur as described above.

Next, an operation of the encoder 1a according to this embodiment will be described with reference to the accompanying drawings.

First, the overall operation of the encoder 1a according to this embodiment is the same as that of the encoder 1 according to the first embodiment except that an operation of the IIR filter unit 40a is different and the processing of the post-processing unit 50 becomes unnecessary due to the nonoccurrence of circulation in first positional information (x).

Next, the operation of the IIR filter unit 40a according to this embodiment will be described.

Figure 8:
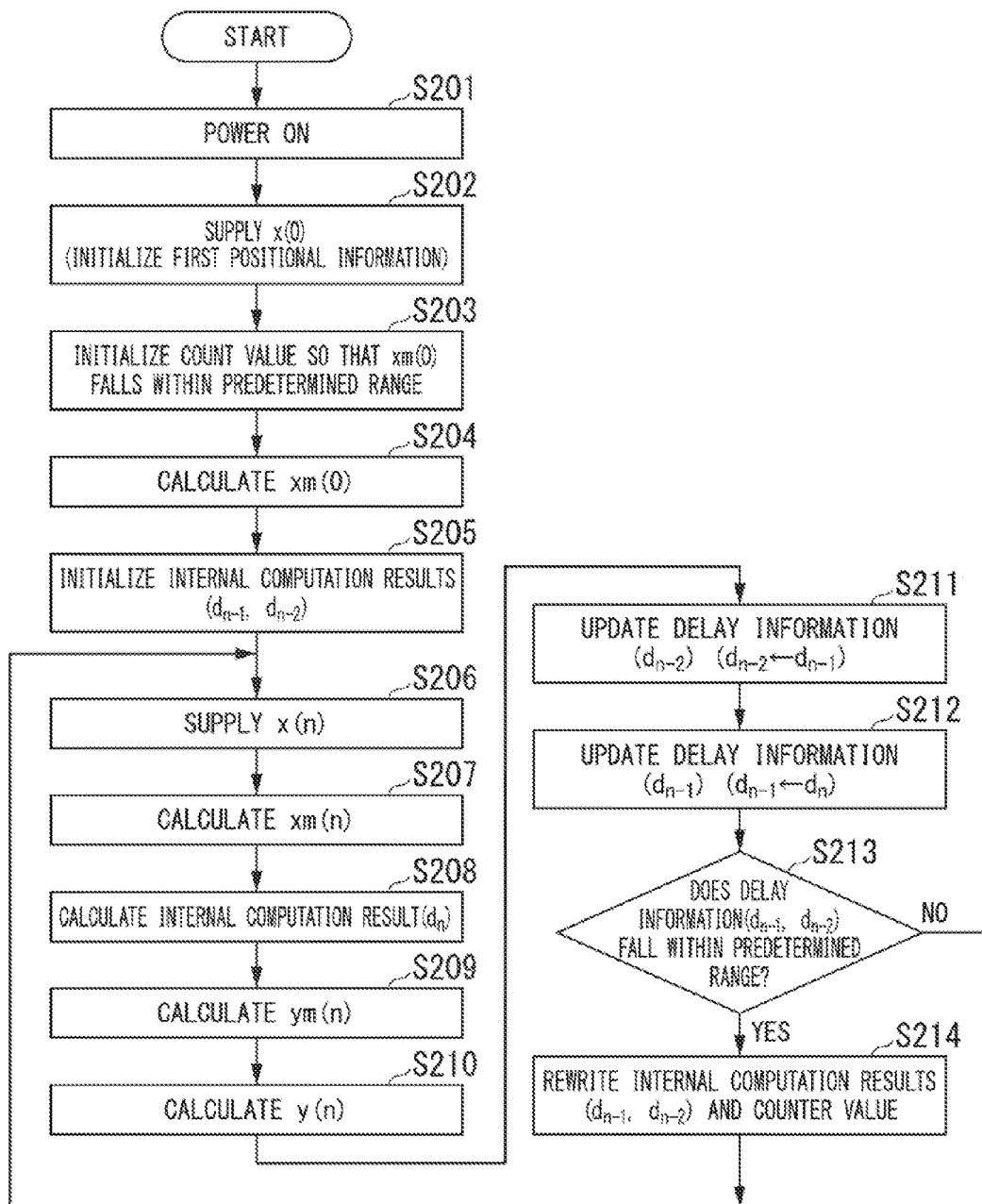
FIG. 8 is a flow chart showing an example of an operation of the IIR filter unit according to the second embodiment.

FIG. 8 is a flow chart showing an example of the operation of the IIR filter unit 40a according to this embodiment.

In FIG. 8, first, power is supplied to the encoder 1a (power on) (step S201).

Next, the positional information generation unit 30 supplies first positional information (x(0)) to the IIR filter unit 40a (step S202). That is, the positional information generation unit 30 supplies an initial value (x(0)) of the first positional information to the IIR filter unit 40a to thereby initialize the input information (first positional information).

Next, the overflow processing unit 42a initializes the count value of the counter unit 43 so that the input information (xm(0)) falls within a predetermined range (range of −0.5 to +0.5) (step S203).

Next, the input processing unit 44 calculates the input information (xm(0)) (step S204).

That is, the subtracter 441 of the input processing unit 44 subtracts the count value stored in the counter unit 43 from the first positional information (x(0)) to thereby generate the input information (xm(0)). The subtracter 441 outputs the generated input information (xm(0)) to the computation unit 70.

Next, the IIR filter unit 40a initializes pieces of delay information ($d_{n-1}$ and $d_{n-2}$) which are internal computation results (step S205). That is, the computation unit 70 of the IIR filter unit 40a calculates an internal computation result ($d_n$) corresponding to ¼ of the input information (xm(0)) based on the initial value (xm(0)) of the input information, and causes the computation result storage unit 411 and the computation result storage unit 412 to sequentially store the calculated internal computation result ($d_n$). Thus, the IIR filter unit 40a initializes the pieces of delay information ($d_{n-1}$ and $d_{n-2}$). That is, the IIR filter unit 40a continuously supplies the input information (xm(0)) for a period which is sufficiently longer than a sampling period to thereby initialize the pieces of delay information ($d_{n-1}$ and $d_{n-2}$) to a value of ¼ of the input information (xm(0)). Alternatively, the IIR filter unit 40a directly rewrites the pieces of delay information ($d_{n-1}$ and $d_{n-2}$) using a signal from the overflow processing unit (also serving as an initialization processing unit) to thereby initialize the pieces of delay information to a value of ¼ of the input information (xm(0)).

Next, the positional information generation unit 30 supplies the first positional information (x(n)) to the IIR filter unit 40a (step S206). That is, the positional information generation unit 30 generates positional information and supplies the generated positional information to the IIR filter unit 40a as the first positional information (x(n)).

Next, the input processing unit 44 calculates input information (xm(n)) (step S207).

That is, the subtracter 441 of the input processing unit 44 subtracts the count value stored in the counter unit 43 from the first positional information (x(n)) to thereby generate the input information (xm(n)). The subtracter 441 outputs the generated input information (xm(n)) to the computation unit 70.

Next, the computation unit 70 calculates an internal computation result ($d_n$) (step S208). That is, the computation unit 70 generates the internal computation result ($d_n$) based on the pieces of delay information ($d_{n-1}$ and $d_{n-2}$) stored in the delay information storage unit 41, the input information (xm(n)), and predetermined filter coefficients (k, $b_1$, and $b_2$). Here, for example, multipliers (701, 724, and 725), the subtracter 711, and the adder 712 of the computation unit 70 generate the internal computation result ($d_n$).

Next, the computation unit 70 calculates output information (ym(n)) (step S209). That is, the computation unit 70 generates the output information (ym(n)) based on the internal computation result ($d_n$), the pieces of delay information ($d_{n-1}$ and $d_{n-2}$) stored in the delay information storage unit 41, and predetermined filter coefficients ($a_0$, $a_1$, and $a_2$). Here, for example, the multipliers (721, 722, and 723), and the adders (713 and 714) of the computation unit 70 generate the output information (ym(n)) which is second positional information.

Next, the output processing unit 45 generates second positional information (y(n)) (step S210). That is, the adder 451 of the output processing unit 45 adds the output information (ym(n)) and the count value stored in the counter unit 43 to thereby generate the second positional information (y(n)). The adder 451 outputs the generated second positional information (y(n)) to the I/F unit 60.

Next, the computation result storage unit 412 of the delay information storage unit 41 updates the delay information ($d_{n-2}$) (step S211). That is, the computation result storage unit 412 stores the delay information ($d_{n-1}$) stored in the computation result storage unit 411 as the delay information ($d_{n-2}$).

Next, the computation result storage unit 411 of the delay information storage unit 41 updates the delay information ($d_{n-1}$) (step S212). That is, the computation result storage unit 411 stores the internal computation result ($d_n$) calculated by the computation unit 70 as the delay information ($d_{n-1}$).

Next, the overflow processing unit 42a determines whether or not the pieces of delay information ($d_{n-1}$ and $d_{n-2}$) fall outside of a predetermined range (step S213). That is, the overflow processing unit 42a determines whether or not the pieces of delay information ($d_{n-1}$ and $d_{n-2}$) fall outside of a range of, for example, −0.125 to +0.125. When the overflow processing unit 42a determines that the pieces of delay information ($d_{n-1}$ and $d_{n-2}$) fall outside of a range of −0.125 to +0.125 (step S213: YES), the process proceeds to step S214. In addition, when the overflow processing unit 42a determines that the pieces of delay information ($d_{n-1}$ and $d_{n-2}$) fall outside of a range of −0.125 to +0.125 (step S213: NO), the process returns to step S206.

Next, in step S214, the overflow processing unit 42a rewrites the values of the pieces of delay information ($d_{n-1}$ and $d_{n-2}$) and the count value based on a unit of change (for example, a unit of ±1) of the input information (xm(n)). For example, when the values of the pieces of delay information ($d_{n-1}$ and $d_{n-2}$) are set to equal to or greater than +0.125, the overflow processing unit 42a changes the values of the pieces of delay information ($d_{n-1}$ and $d_{n-2}$) stored respectively in the computation result storage unit 411 and the computation result storage unit 412 to values changed by −0.25 (values subtracted by 0.25). Then, the overflow processing unit 42a causes the counter unit 43 to change the count value by counting +1.

In addition, for example, when the values of the pieces of delay information ($d_{n-1}$ and $d_{n-2}$) are set to equal to or less than −0.125, the overflow processing unit 42a changes the values of the pieces of delay information ($d_{n-1}$ and $d_{n-2}$) stored respectively in the computation result storage unit 411 and the computation result storage unit 412 to values changed by +0.25 (values added by 0.25). Then, the overflow processing unit 42a causes the counter unit 43 to change the count value by counting −1.

The process in the IIR filter unit 40a returns to step S206 after the process of step S214, and the processes of step S206 to step S213 (or step S214) are repeated. Moreover, in the IIR filter unit 40a, a series of processes of step S206 to step S213 (or step S214) are performed for each unit time (sampling period).

As described above, in the encoder 1a according to this embodiment, the sensor unit 20 outputs detected signals (for example, an ABS signal and an INC signal) based on the positional information of the rotor. The positional information generation unit 30 generates positional information (x) as first positional information based on the detected signals output by the sensor unit 20. The IIR filter unit 40a outputs second positional information (y) obtained by performing filtering on first positional information (x) based on a predetermined filter coefficient. In the IIR filter unit 40a, the counter unit 43 stores a value corresponding to a predetermined high-order digit of the first positional information (x), as a count value. The input processing unit 44 subtracts the first positional information (x) from the count value stored in the counter unit 43 to thereby generate input information (xm). The delay information storage unit 41 stores an internal computation result ($d_n$) based on the first positional information (x), as pieces of delay information (for example, $d_{n-1}$ and $d_{n-2}$). The computation unit 70 generates the internal computation result ($d_n$) based on the pieces of delay information stored in the delay information storage unit 41, the first positional information (x), and the predetermined filter coefficient, and generates output information (ym). The output processing unit 45 adds the output information (ym) and the count value stored in the counter unit 43 to thereby generate second positional information (y). When the values of the pieces of delay information (for example, $d_{n-1}$ and $d_{n-2}$) are set to values falling outside of a predetermined range (for example, falling outside of a range −0.125 to +0.125) which is set in advance, the overflow processing unit 42a changes the values of the pieces of delay information (for example, $d_{n-1}$ and $d_{n-2}$) based on a unit of change (for example, a unit of ±1) of the input information (xm) and changes the count value.

Thus, since the encoder 1a according to this embodiment can perform filtering on the positional information (x) generated by the positional information generation unit 30, characteristics of the IIR filter unit 40a are not restricted due to, for example, a frequency of the detected signal (INC signal). For this reason, the encoder 1a according to this embodiment can expand a frequency range capable of reducing disturbance (noise) by the IIR filter unit 40a. For example, the encoder 1a according to this embodiment can reduce influence due to disturbance (noise) which is equal to or less than the maximum frequency of the INC signal. Therefore, the encoder 1a according to this embodiment can reduce the erroneous detection of positional information of a driven body (for example, a rotor) and to improve reliability.

Further, since the IIR filter unit 40a is constituted by an IIR filter, the filter unit can be simply configured with a small computation amount. For this reason, the encoder 1a according to this embodiment can reduce the erroneous detection of positional information of a driven body (for example, a rotor) through a simple configuration and can improve reliability.

In the encoder 1a according to this embodiment, the input processing unit 44 and the counter unit 43 reduce the number of processing digits of the computation unit 70, and the overflow processing unit 42a changes the pieces of delay information (for example, $d_{n-1}$ and $d_{n-2}$) so that, for example, the values of the pieces of delay information (for example, $d_{n-1}$ and $d_{n-2}$) do not significantly fall outside of a range of −0.125 to +0.125. Thus, the encoder 1a according to this embodiment can exclude high-order digits with little change in the first positional information (x) from the computation of the IIR filter unit 40a. For this reason, the encoder 1a according to this embodiment can reduce the circuit scale of the computation unit 70 (the circuit scale of, for example, the multiplier, the adder, and the subtracter). In addition, the encoder 1a according to this embodiment can compute low-order digits in the first positional information (x) with a high level of accuracy. Therefore, the encoder 1a according to this embodiment can detect the positional information of a driven body (for example, rotor) with a high level of accuracy through a simple configuration.

In addition, similarly to the first embodiment, the encoder 1a according to this embodiment can expand a frequency range capable of reducing disturbance (noise) without changing a delay amount for outputting positional information. For this reason, similarly to the first embodiment, the encoder 1a according to this embodiment can accurately control a motor of, for example, a robot device.

In this embodiment, the above-mentioned predetermined range (range of, for example, −0.125 to +0.125) is set in advance based on a unit of change (for example, a unit of ±1) of the input information (xm) and a predetermined filter coefficient. The overflow processing unit 42a changes the values of the pieces of delay information (for example, $d_{n-1}$ and $d_{n-2}$) so that the values of the pieces of delay information (for example, $d_{n-1}$ and $d_{n-2}$) fall within the predetermined range.

Thus, the IIR filter unit 40a can appropriately perform filtering so that the values of the pieces of delay information do not fall outside of a computation corresponding range (range of, for example, −0.25 to +0.25).

In this embodiment, the counter unit 43 changes the count value by using the amount of displacement (for example, "1") corresponding to the unit of change (for example, a unit of ±1) of the input information (xm) as a unit of change. When the count value stored in the counter unit 43 is changed, the overflow processing unit 42a causes the counter unit 43 to change the count value in the unit of change (for example, "1").

Thus, the IIR filter unit 40a can change the input information (xm) so that the values of the pieces of delay information (for example, $d_{n-1}$ and $d_{n-2}$) fall within the predetermined range, through a simple configuration. Therefore, the encoder 1a according to this embodiment can detect the positional information of a driven body (for example, rotor) with a high level of accuracy through a simple configuration.

Next, a third embodiment will be described with reference to the accompanying drawings.

Third Embodiment

Figure 9:
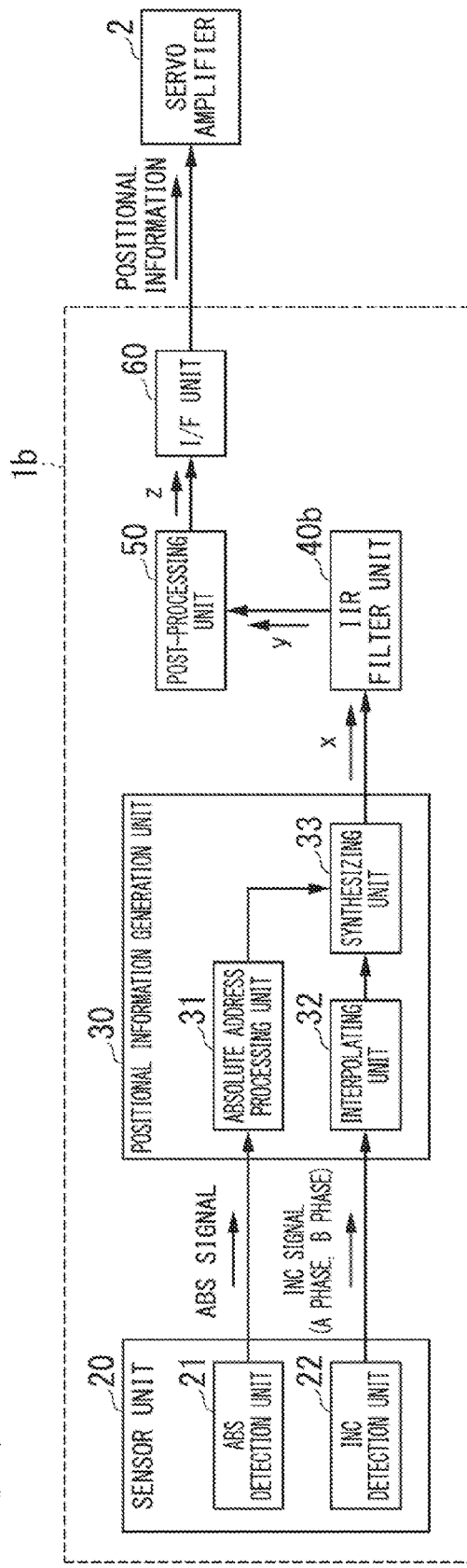
FIG. 9 is a block diagram showing an encoder according to a third embodiment.

FIG. 9 is a schematic block diagram showing an example of an encoder 1b according to this embodiment.

In FIG. 9, the encoder 1b includes a sensor unit 20, a positional information generation unit 30, an IIR filter unit 40b, a post-processing unit 50, and an I/F unit 60. In the diagram, the same components as those in FIG. 1 or 6 will be denoted by the same reference numerals and signs, and the description thereof will be omitted here.

Similarly to the first embodiment, the encoder 1b according to this embodiment shows an example in which discontinuity due to occurring in a value of first positional information is associated with the encoder 1a according to the second embodiment. Here, the encoder 1b is different from the encoder 1a according to the second embodiment in that the configuration of the IIR filter unit 40b is different and the post-processing unit 50 similar to that in the first embodiment is provided.

Moreover, similarly to the first embodiment, first positional information (x) generated by the positional information generation unit 30 is information having a predetermined number of digits and circulating by the predetermined number of digits.

Similarly to the first embodiment, the post-processing unit 50 according to this embodiment corrects second positional information (y) falling outside of a variable range (range of equal to or greater than 0 degrees and less than 360 degrees (0 to $2^n-1$)) of absolute positional information of a rotor due to filtering using the IIR filter unit 40b so that the second positional information falls within the variable range. For example, the post-processing unit 50 outputs low-order bits (for example, n bits) in the second positional information (y) which correspond to the variable range of the first positional information (x), as positional information (z).

The IIR filter unit 40b is a filter circuit that outputs the second positional information (y) obtained by performing filtering on the first positional information (x) based on a predetermined filter coefficient. The IIR filter unit 40b includes, for example, a biquadratic low pass filter. Moreover, in this embodiment, an example in which the IIR filter unit 40b is a digital filter is shown, and both of the first positional information (x) and the second positional information (y) as output information are digital values. The IIR filter unit 40b reduces frequency components having a predetermined frequency or higher, set in advance, which are included in the first positional information (x) based on a predetermined filter coefficient set in advance to thereby generate the second positional information (y).

Next, the configuration of the IIR filter unit 40b will be described.

Figure 10:
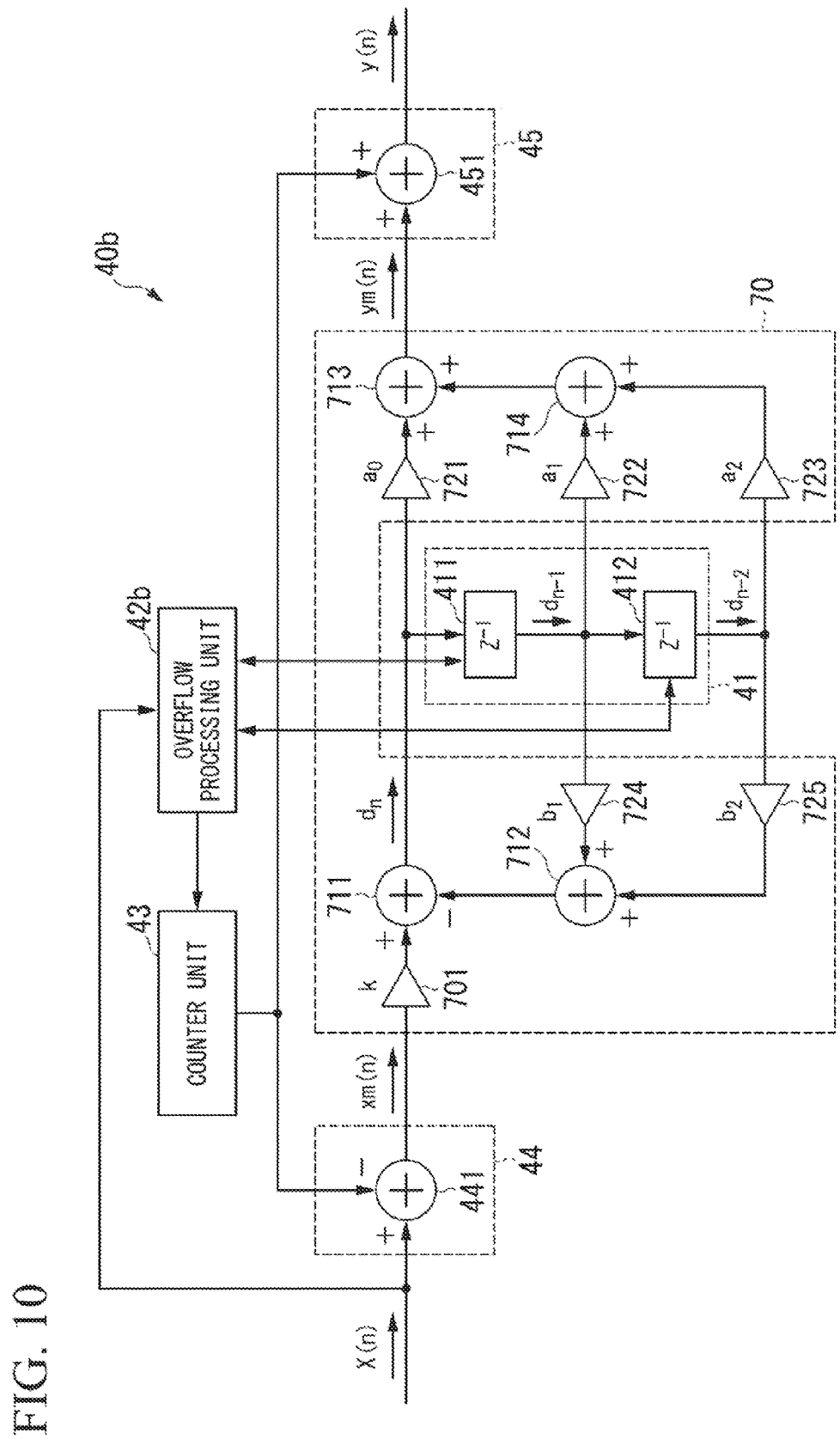
FIG. 10 is a block diagram showing an IIR filter unit according to the third embodiment.

FIG. 10 is a block diagram showing the IIR filter unit 40b according to this embodiment.

The IIR filter unit 40b includes a delay information storage unit 41, an overflow processing unit 42b, a counter unit 43, an input processing unit 44, an output processing unit 45, and a computation unit 70. In the diagram, the same components as those in FIG. 7 will be denoted by the same reference numerals and signs, and the description thereof will be omitted here.

The overflow processing unit 42b performs the same processing as that of the overflow processing unit 42a according to the second embodiment, and changes a count value stored in the counter unit 43 based on a variable range of first positional information (x(n)) when discontinuity due to circulation occurs in the first positional information (x(n)). That is, the overflow processing unit 42b determines whether or not discontinuity due to circulation occurs in the first positional information (x(n)). When discontinuity due to circulation occurs in the first positional information (x(n)), the overflow processing unit changes the count value by the amount of change corresponding to the circulation of the first positional information (x(n)). Moreover, similarly to the first embodiment, when discontinuity due to circulation occurs, a value falling outside of the variable range of the first positional information (x(n)) appears in the second positional information (y).

Next, an operation of the encoder 1b according to this embodiment will be described with reference to the accompanying drawings.

First, the overall operation of the encoder 1b according to this embodiment is the same to that of the encoder 1a according to the second embodiment except that an operation of the IIR filter unit 40b is different and processing using the post-processing unit 50 is added.

Next, operations of the IIR filter unit 40b and the post-processing unit 50 according to this embodiment will be described.

Figure 11:
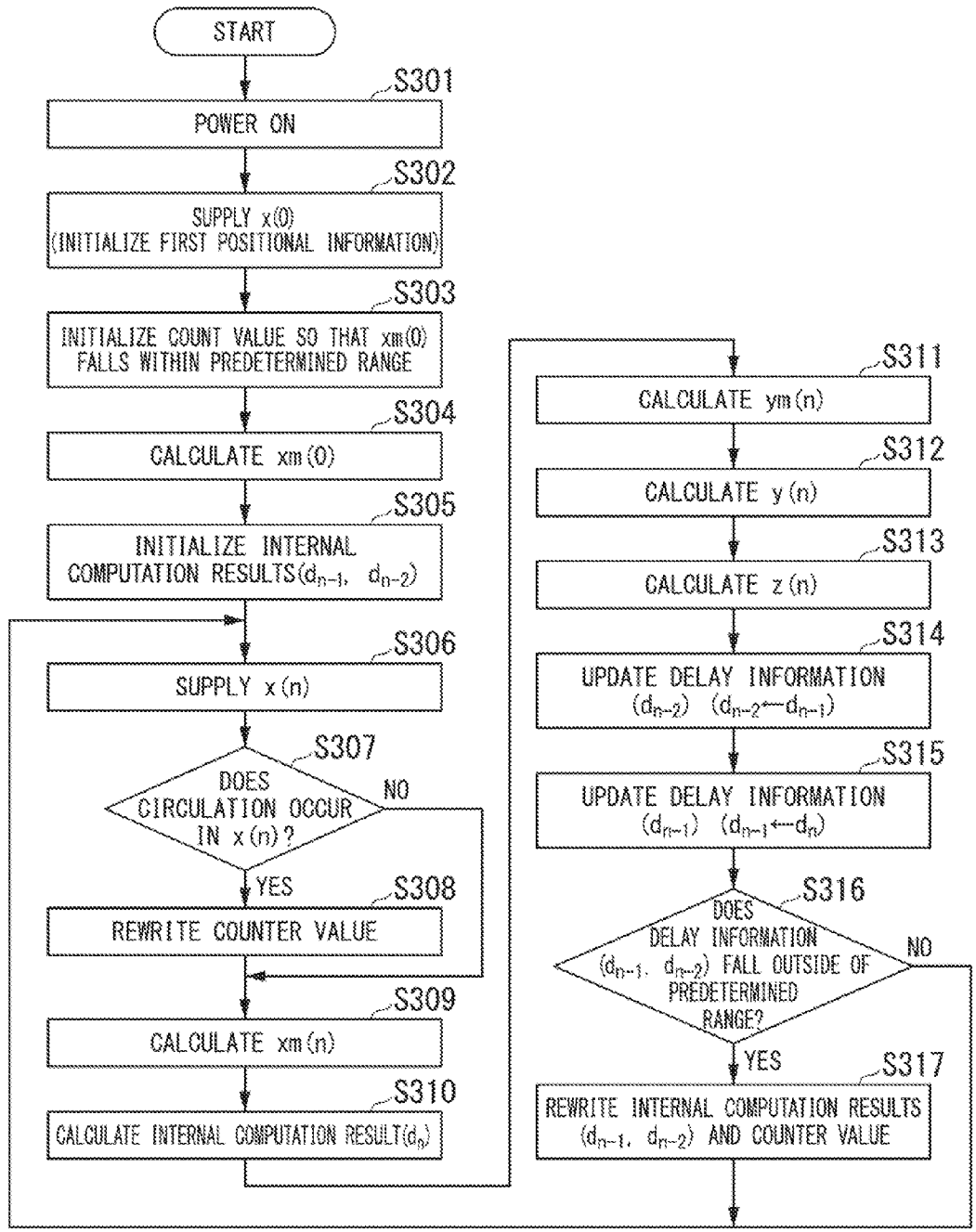
FIG. 11 is a flow chart showing an example of operations of the IIR filter unit and a post-processing unit according to the third embodiment.

FIG. 11 is a flow chart showing an example of operations of the IIR filter unit 40b and the post-processing unit 50 according to this embodiment.

In FIG. 11, first, power is supplied to the encoder 1b (power on) (step S301). Moreover, the processes of step S301 to step S306 are the same as the processes of step S201 to step S206 according to the second embodiment shown in FIG. 8, and thus the description thereof will be omitted here.

In step S307, the overflow processing unit 42b determines whether or not circulation occurs in the value of the input information (x(n)) which is the first positional information. That is, the overflow processing unit 42b determines whether or not discontinuity due to the circulation occurs in the value of the first positional information (x(n)). When the overflow processing unit 42b determines that discontinuity due to the circulation occurs (step S307: YES), the process proceeds to step S308. In addition, when the overflow processing unit 42b determines that discontinuity due to the circulation does not occur (step S307: NO), the process proceeds to step S309.

In step S308, the overflow processing unit 42b rewrites the count value stored in the counter unit 43. That is, the overflow processing unit 42b changes the count value by the amount of change corresponding to the circulation of the first positional information (x(n)) based on the variable range of the first positional information. After the overflow processing unit 42 changes the count value, the process proceeds to step S309.

The next processes of step S309 to step S312 are the same as the processes of step S207 to step S210 according to the second embodiment shown in FIG. 8, and thus the description thereof will be omitted here.

Next, the post-processing unit 50 calculates positional information (z(n)) (step S313). That is, similarly to the first embodiment, the post-processing unit 50 generates the positional information (z(n)) so that the second positional information (y(n)) output by the IIR filter unit 40b falls within the variable range of the positional information of the rotor.

The next processes of step S314 to step S317 are the same as the processes of step S211 to step S214 according to the second embodiment shown in FIG. 8, and thus the description thereof will be omitted here.

As described above, in the encoder 1b according to this embodiment, the first positional information (x) is information having a predetermined number of digits and circulating by the predetermined number of digits. When discontinuity due to circulation occurs in the first positional information (x), the overflow processing unit 42b changes the count value stored in the counter unit 43 based on the variable range of the first positional information (x).

Thus, the encoder 1b according to this embodiment can exhibit the same effects as those in the second embodiment, and can reduce the erroneous detection of positional information of a driven body (for example, a rotor) even when discontinuity due to circulation occurs in the positional information.

Fourth Embodiment

Next, a drive device (motor device, actuator) including the encoder 1 (1a, 1b) according to the above-described embodiment will be described.

Figure 12:
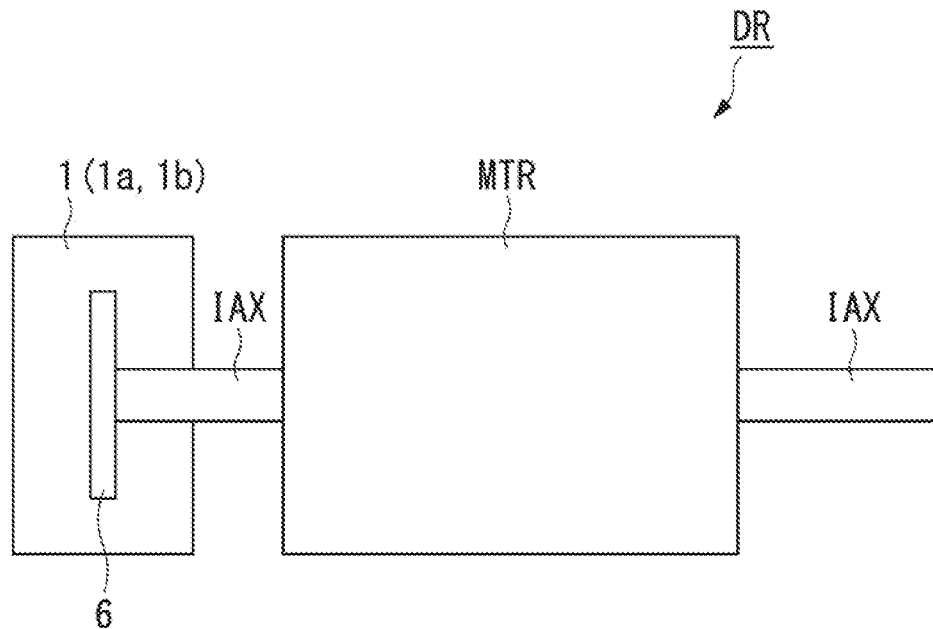
FIG. 12 is a schematic diagram of a drive device according to this embodiment.

FIG. 12 is a schematic diagram of a drive device DR according to this embodiment. The drive device DR according to this embodiment includes a motor MTR that rotates an input axis IAX, and the encoder 1 (1a, 1b) provided in the input axis IAX (rotor 6). That is, the drive device DR includes the encoder 1 (1*a*, 1*b*), and the motor MTR (driving unit) that drives the input axis IAX (driven body).

The encoder 1 (1*a*, 1*b*) detects a rotational position (angular position) of the input axis IAX (driven body) and outputs information including the rotational position, as an encoder signal, to a higher-level controller (the servo amplifier 2 or the like) which controls the drive device DR. The higher-level controller controls the drive device DR together with the encoder signal received from the encoder 1 (1*a*, 1*b*). Since the encoder 1 (1*a*, 1*b*) according to this embodiment can reduce the erroneous detection of the rotational position of the input axis IAX, the drive device DR according to this embodiment can perform the position control of the input axis IAX of the motor MTR with a high level of accuracy. In addition, the drive device DR according to this embodiment can increase reliability in the position control.

Figure 13:
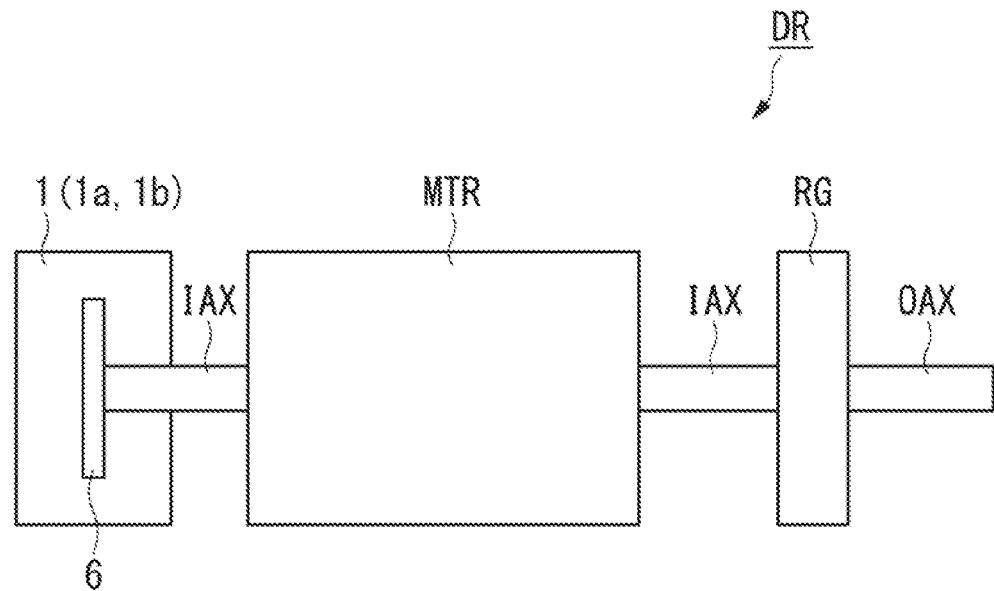
FIG. 13 is a schematic diagram of the drive device including a speed reducer according to this embodiment.

Moreover, the drive device DR according to this embodiment may be configured such that a speed reducer RG (for example, a planetary gear mechanism) is provided in the input axis IAX of the motor MTR, as shown in FIG. 13. In this case, the encoder 1 (1*a*, 1*b*) according to this embodiment may be disposed in an output axis OAX of the speed reducer RG or may be disposed in both the input axis IAX of the motor MTR and the output axis OAX of the speed reducer RG.

In addition, the drive device DR according to this embodiment may be provided in a robot device such as, for example, a articulated robot or a vehicle (for example, an electric vehicle) which includes an arm and the like.

Moreover, the invention is not limited to the above-described embodiments, and can be modified without departing from the scope of the invention.

For example, in the above-described embodiments, a case where the encoder 1 (1*a*, 1*b*) is a rotary encoder has been described as an example, but a configuration in which the invention is applied to a linear encoder may also be adopted.

In the above-described embodiments, a case where the IIR filter unit 40 (40*a*, 40*b*) includes a biquadratic low pass filter has been described. However, the invention is not limited thereto, and a configuration in which the invention is applied to another type of IIR filter may be adopted. For example, the IIR filter unit 40 (40*a*, 40*b*) may be a primary low pass filter or may be a third-order or higher-order low pass filter. In addition, a filter coefficient is not limited to those in the above-described embodiments.

In addition, the IIR filter unit 40 (40*a*, 40*b*) is not limited to a low pass filter, and the processing can be similarly performed using, for example, a band stop filter.

In the above-described embodiments, a description has been made of a configuration of the positional information generation unit 30 in which the absolute address processing unit 31 generates absolute positional information based on an ABS signal when power is supplied thereto and the amount of displacement is counted based on interpolated positional information based on an INC signal after power is supplied, but the invention is not limited thereto. For example, the positional information generation unit 30 may be configured such that first positional information (x) is always generated based on an ABS signal and an INC signal, or may be configured such that first positional information (x) is generated based on an ABS signal or an INC signal. In addition, when first positional information (x) is generated based on an INC signal, a configuration may be adopted in which the sensor unit 20 includes an origin detection unit detecting a reference position (origin position) of a rotor and the positional information generation unit 30 counts the amount of displacement from the origin position.

In the above-described embodiments, a configuration in which the I/F unit 60 performs serial data communication using a differential transmission signal conforming to the RS485 standard has been described as an example. However, the invention is not limited thereto, and a configuration in which the I/F unit performs another interface communication may be adopted.

In the second and third embodiments described above, a description has been made of a configuration in which the overflow processing unit 42*a* (42*b*) changes the values of pieces of delay information ($d_{n-1}$ and $d_{n-2}$) when the values of the pieces of delay information ($d_{n-1}$ and $d_{n-2}$) fall outside of a predetermined range, but the invention is not limited thereto. For example, a configuration may be adopted in which the overflow processing unit 42*a* (42*b*) changes the values of the pieces of delay information ($d_{n-1}$ and $d_{n-2}$) when the value of the delay information $d_{n-1}$ or the delay information $d_{n-2}$ falls outside of the predetermined range.

In addition, a description has been made of a case where a value falling outside of a predetermined range is equal to or greater than +0.125 or equal to or less than −0.125. However, a configuration in which the value is greater than +0.125 or less than −0.125 may be adopted, or a configuration in which other ranges are set as the predetermined range may be adopted.

In the above-described embodiments, the units of the encoder 1 (1*a*, 1*b*) may be realized by a dedicated hardware, and may be realized by a program by including a memory and a central processing unit (CPU).

For example, a configuration may be adopted in which each of the positional information generation unit 30, the IIR filter unit 40 (40*a*, 40*b*), and the post-processing unit 50 is realized by an application specific integrated circuit (ASIC) or a field-programmable gate array (FPGA), or a configuration may be adopted in which each of the units is realized by a computer such as a digital signal processor (DSP) or a personal computer (PC).

The above-described encoder 1 (1*a*, 1*b*) has a computer system therein. The course of processing of the encoder 1 (1*a*, 1*b*) mentioned above is stored in a computer-readable recording medium in the form of a program, and the processing is performed by reading and executing the program by a computer. Here, the computer-readable recording medium may be a magnetic disk, a magneto-optical disk, a CD-ROM, a DVD-ROM, a semiconductor memory, or the like. In addition, the computer program may be distributed to a computer using a communication line, and the computer having received the distribution may execute the program.

DESCRIPTION OF THE REFERENCE SYMBOLS

1, 1*a*, 1*b*: Encoder
6: Rotor
20: Sensor unit
30: Positional information generation unit
40, 40*a*, 40*b*: IIR filter unit
41: Delay information storage unit
42, 42*a*, 42*b*: Overflow processing unit
43: Counter unit
44: Input processing unit
45: Output processing unit
50: Post-processing unit
70: Computation unit
DR: Drive device
MTR: Motor

What is claimed is:

1. An encoder comprising:
a sensor unit configured to output a detected signal based on positional information of a driven body;
a positional information generation unit configured to generate the positional information as first positional information based on the detected signal which is output by the sensor unit; and
an IIR filter unit configured to output second positional information obtained by performing filtering on the first positional information based on a predetermined filter coefficient,
wherein the IIR filter unit includes
a counter unit configured to store a value corresponding to a predetermined high-order digit of the first positional information, as a count value,
an input unit configured to subtract the count value stored in the counter unit from the first positional information to thereby generate input information,
a delay information storage unit configured to store an internal computation result based on the input information, as delay information,
a computation unit configured to generate the internal computation result based on the delay information stored in the delay information storage unit, the input information, and the predetermined filter coefficient, and generates output information on which filtering is performed,
an output unit configured to add the count value and the output information to thereby generate the second positional information, and
a changing unit configured to change a value of the delay information based on a unit of change of the input information when the value of the delay information falls outside of a predetermined range which is set in advance, and changes the count value.

2. The encoder according to claim 1, wherein the predetermined range is set in advance based on the unit of change of the input information and the predetermined filter coefficient.

3. The encoder according to claim 1, wherein the changing unit changes the value of the delay information so that the value of the delay information falls within the predetermined range.

4. The encoder according to claim 1,
wherein the first positional information is information having a predetermined number of digits and circulating by the predetermined number of digits, and
wherein the changing unit changes the count value based on a variable range of the first positional information when discontinuity due to circulation occurs in the first positional information.

5. The encoder according to claim 1,
wherein the delay information storage unit stores information obtained by delaying the internal computation result for each unit time, as a plurality of pieces of delay information, and
wherein the computation unit generates the output information as a sum of values obtained by multiplying each of the plurality of pieces of delay information and the internal computation result by an integer.

6. An encoder comprising:
a sensor unit configured to output a detected signal based on positional information of a driven body;
a positional information generation unit configured to generate the positional information as first positional information having a predetermined number of digits and circulating by the predetermined number of digits, based on the detected signal which is output by the sensor unit; and
an IIR filter unit configured to output second positional information obtained by performing filtering on the first positional information based on a predetermined filter coefficient,
wherein the IIR filter unit includes
a delay information storage unit configured to store an internal computation result based on the first positional information, as delay information,
a computation unit configured to generate the internal computation result based on the delay information stored in the delay information storage unit, the first positional information, and the predetermined filter coefficient, and generates the second positional information, and
a changing unit configured to change a value of the delay information based on a variable range of the first positional information when discontinuity due to circulation occurs in a value of the first positional information.

7. The encoder according to claim 6,
wherein the delay information storage unit stores information obtained by delaying the internal computation result for each unit time, as a plurality of pieces of delay information, and
wherein the computation unit generates the second positional information as a sum of values obtained by multiplying each of the plurality of pieces of delay information and the internal computation result by an integer.

8. The encoder according to claim 6, further comprising a post-processing unit configured to output low-order bits in the second positional information which correspond to the variable range of the first positional information, as the positional information.

9. The encoder according to claim 6, wherein the IIR filter unit includes a biquadratic low pass filter.

10. A drive device comprising:
the encoder according to claim 1; and
a driving unit configured to drive the driven body.

11. The encoder according to claim 1, further comprising a post-processing unit configured to output low-order bits in the second positional information which correspond to the variable range of the first positional information, as the positional information.

12. The encoder according to claim 1, wherein the IIR filter unit includes a biquadratic low pass filter.

* * * * *